US011797168B1

(12) United States Patent
Filippi et al.

(10) Patent No.: US 11,797,168 B1
(45) Date of Patent: *Oct. 24, 2023

(54) BINNING INFORMATION ASSOCIATED WITH RANGES OF TIME

(71) Applicant: SPLUNK INC., San Francisco, CA (US)

(72) Inventors: Nicholas Filippi, San Francisco, CA (US); Siegfried Puchbauer-Schnabel, San Francisco, CA (US); Cary Noel, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,842

(22) Filed: Jul. 1, 2022

Related U.S. Application Data

(63) Continuation of application No. 16/850,967, filed on Apr. 16, 2020, now Pat. No. 11,422,686, which is a continuation of application No. 15/886,804, filed on Feb. 1, 2018, now Pat. No. 10,671,262, which is a continuation of application No. 14/607,873, filed on Jan. 28, 2015, now Pat. No. 9,921,733.

(51) Int. Cl.
*G06F 3/04847* (2022.01)

(52) U.S. Cl.
CPC ................... *G06F 3/04847* (2013.01)

(58) Field of Classification Search
CPC .................................................. G06F 3/04847
See application file for complete search history.

(56) References Cited

U.S. PATENT DOCUMENTS

| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 9,317,539 B2 | 4/2016 | Sato et al. |
| 10,127,258 B2 | 11/2018 | Lamas et al. |
| 2005/0203888 A1 | 9/2005 | Woosley et al. |

(Continued)

OTHER PUBLICATIONS

Non Final Office Action received for U.S. Appl. No. 14/607,873 dated Jun. 2, 2017, 14 pages.

(Continued)

*Primary Examiner* — Cao H Nguyen
(74) *Attorney, Agent, or Firm* — Artegis Law Group, LLP

(57) ABSTRACT

Provided are systems and methods for determining and displaying automatically binned information via a graphical user interface. A graphical user interface (GUI) may include a first graphical element representing a first metric value for a first time window and a second graphical element representing a second metric value for a second time window. An indication of a selection of the first time window may be received via the GUI. An updated GUI comprising a third graphical element representing a third metric value for the third time window and a fourth graphical element representing the fourth metric value for the fourth time window may be displayed, wherein the third time window and the fourth time window may be sub-ranges of the first time window.

18 Claims, 24 Drawing Sheets

(56) References Cited

U.S. PATENT DOCUMENTS

| | | |
|---|---|---|
| 2010/0306151 A1 | 12/2010 | Bickel et al. |
| 2010/0325314 A1 | 12/2010 | Onuki |
| 2011/0261055 A1* | 10/2011 | Wong .................... G06T 11/206 |
| | | 345/440 |
| 2012/0179989 A1 | 7/2012 | Li et al. |
| 2013/0019188 A1 | 1/2013 | Hasegawa et al. |
| 2013/0104065 A1 | 4/2013 | Stecher |
| 2013/0332594 A1* | 12/2013 | Dvir ....................... G06F 11/00 |
| | | 709/224 |
| 2014/0040815 A1 | 2/2014 | Goossens et al. |
| 2015/0040052 A1* | 2/2015 | Noel .................... G06F 3/04847 |
| | | 715/771 |
| 2015/0277708 A1 | 10/2015 | Rodrig et al. |
| 2016/0092485 A1* | 3/2016 | Lamas ................. G06F 16/2477 |
| | | 707/746 |
| 2019/0098106 A1 | 3/2019 | Mungel et al. |

OTHER PUBLICATIONS

Notice of Allowance received for U.S. Appl. No. 14/607,873 dated Nov. 2, 2017, 5 pages.

Non Final Office Action received for U.S. Appl. No. 15/886,804 dated Jun. 27, 2019, 13 pages.

Notice of Allowance received for U.S. Appl. No. 15/886,804 dated Dec. 30, 2019, 5 pages.

Non Final Office Action received for U.S. Appl. No. 16/850,967 dated Oct. 1, 2021, 27 pages.

Notice of Allowance received for U.S. Appl. No. 16/850,967 dated Mar. 31, 2022, 8 pages.

Splunk Enterprise 8.0.0 Overview, available online, retrieved on May 20, 2020 from docs.splunk.com, 17 pages.

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

Original Search: 1501
search "error" | stats count BY host

Sent to peers: 1502
search "error" | prestats count BY host(map)

Executed by search head: 1503
Merge prestats results received from peers (reduce)

BINNING INFORMATION ASSOCIATED WITH RANGES OF TIME

CROSS-REFERENCE TO RELATED APPLICATIONS

This application is a continuation of the co-pending U.S. patent application titled, "BINNING INFORMATION ASSOCIATED WITH RANGES OF TIME," filed on Apr. 16, 2020 and having Ser. No. 16/850,967, which is a continuation of U.S. patent application titled, "BINNING INFORMATION ASSOCIATED WITH RANGES OF TIME," filed on Feb. 1, 2018 and having Ser. No. 15/886,804, Issued as U.S. Pat. No. 10,671,262, which is a continuation of U.S. patent application titled, "GRAPHICAL INTERFACE FOR AUTOMATICALLY BINNED INFORMATION," filed on Jan. 28, 2015 and having Ser. No. 14/607,873, Issued as U.S. Pat. No. 9,921,733. The subject matter of this related application are hereby incorporated herein by reference.

TECHNICAL FIELD

The embodiments described herein relate generally to data processing and data management systems. More particularly, embodiments relate to determining and displaying automatically binned information via a graphical user interface.

BACKGROUND OF THE INVENTION

Information systems generate vast amounts and wide varieties of machine data such as activity logs, error logs, configuration files, network packets, application data, virtual machine data database records, etc. This machine data may be useful in troubleshooting systems, detecting operation trends, identifying security problems, and measuring system performance. For example, a system administrator may use error logs to determine that a particular component is experiencing a relatively high number of errors and, thus, may have a problem that needs to be addressed. However, the amount of data obtained from such machine data may be overwhelming and difficult for the system administrator to immediately understand. The different types and volume of data generated from the machine data may also make it difficult to see any types of patterns or trends that may exist in the machine data.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 15 illustrates an example search query received from a client and executed by search peers in accordance with one or more embodiments of the disclosure.

FIG. 16B illustrates an example data summary dialog that enables a user to select various data sources in accordance with one or more embodiments of the disclosure.

FIG. 17B illustrates an example incident review dashboard in accordance with one or more embodiments of the disclosure.

DETAILED DESCRIPTION

Throughout this description for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the described embodiments.

Provided are embodiments relating to graphical display of automatically processed information for a service and its various components, or elements. Examples of processing the information may include automatic binning of information. In some embodiments, binning of information or data may include dividing the information or data into time intervals (e.g., bins or time windows) and associating a value representative of the interval to each bin or time window. Embodiments may include graphical displays of one or more dashboards that enable a user to view the automatically binned information for various aspects of a service or application (e.g., the Microsoft Exchange.TM. service) at varying levels of detail. For example, a high-level dashboard (or service-level dashboard) may provide a graphical overview of automatically binned information of a service in large bin or time window of data, such as data segregated into bins equivalent to a calendar month. Upon selecting a graphical element representing a bin or time window, the graphical user interface may re-bin the information into smaller bins or time windows of data, such as data segregated into bins equivalent to a 24 hour period. Upon selecting a graphical element representing a specific 24 hour period bin, the graphical user interface may re-bin the information into even smaller bins of data, such as data segregated into bins equivalent to hourly periods. In such an arrangement, a user is provided with a visual representation of a specific metric over a period of time and may obtain more detailed information upon selecting a graphical element representing a bin.

In some instances, the automatically binned information may be based on data, or source data, received from one or more external data sources, such as servers, computers, routers, databases, operating systems, applications and/or the like. The source data may include raw data, which may include unstructured data, machine data, performance measurements or other time-series data, such as data obtained from web logs, system logs, network packets, application data, virtual machine data, or sensor readings. In some embodiments, the source data may be used to calculate (or otherwise determine) metric values measured at a given point in time.

Illustrative Use Cases and System Architecture

Figure 1:
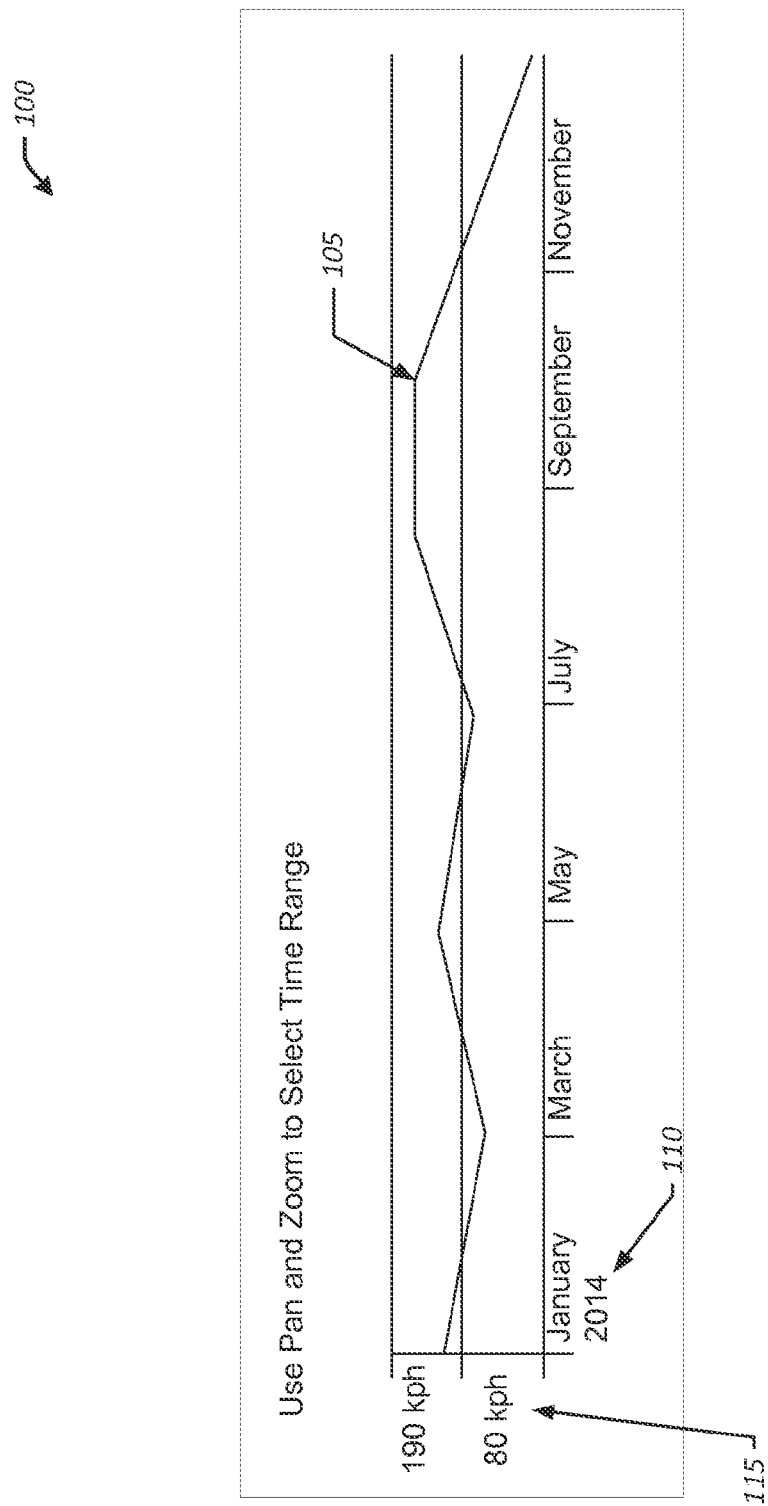
FIG. 1 illustrates an example dashboard for displaying a period of time in accordance with one or more embodiments of the disclosure.

Turning now to the figures, FIG. 1 illustrates an example dashboard 100 in accordance with the disclosed embodiments. The dashboard 100 may display a period of time for which data was measured. In the illustrated embodiment, the dashboard 100 may display a line graph 105 of a speed metric 115 over a time period 110. The period of time may be any amount of time for which data for a metric was obtained or calculated. In some embodiments, multiple metrics may have been measured during the period of time. A user may specify which metric to display in the dashboard 100. In some embodiments, multiple metrics may be simultaneously displayed in the dashboard 100. In some embodiments, a user may specify a period of time for which to display associated metrics. For example, in the illustrated embodiment, the dashboard 100 specifies a time period of Jan. 1, 2014 to Dec. 31, 2014. In some embodiments, the dashboard 100 may automatically display a period of time for which any data has been obtained or calculated. In some embodiments, the user may specify a period of time for which data may be displayed in the dashboard 100.

Figure 2:
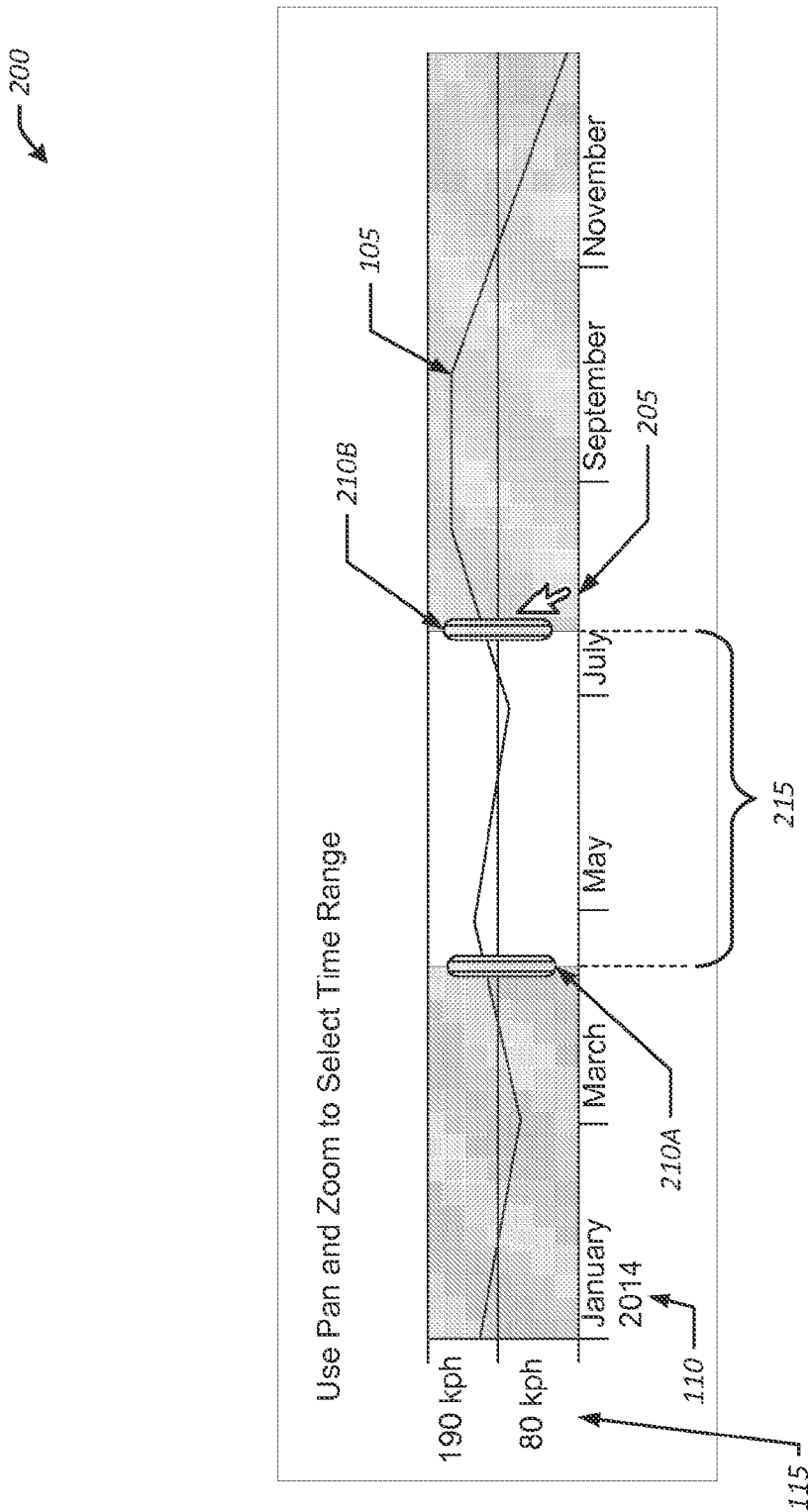
FIG. 2 illustrates an example dashboard for selecting a time range from a period of time in accordance with one or more embodiments of the disclosure.

FIG. 2 illustrates an example dashboard 200 for selecting a time range from a period of time in accordance with one or more embodiments of the disclosure. In some embodiments, a user may direct a pointer 205 using a mouse to interact with one or more graphical elements that may be used to define a time range 215. For example, a user may direct the pointer 205 to select handle 210A of the graphical element to set a beginning time and a handle 210B to set an ending time of the time range 215 of the time period displayed. In some embodiments, the user may slide the handle 210A from the left side of the graphical element to a beginning time of a time range and slide the handle 210B from the right side of the graphical element to an ending time of the time period. In some embodiments, the grayed portion of the graphical elements may indicate the portion of the time period that is being excluded from the time range.

Figure 3A:
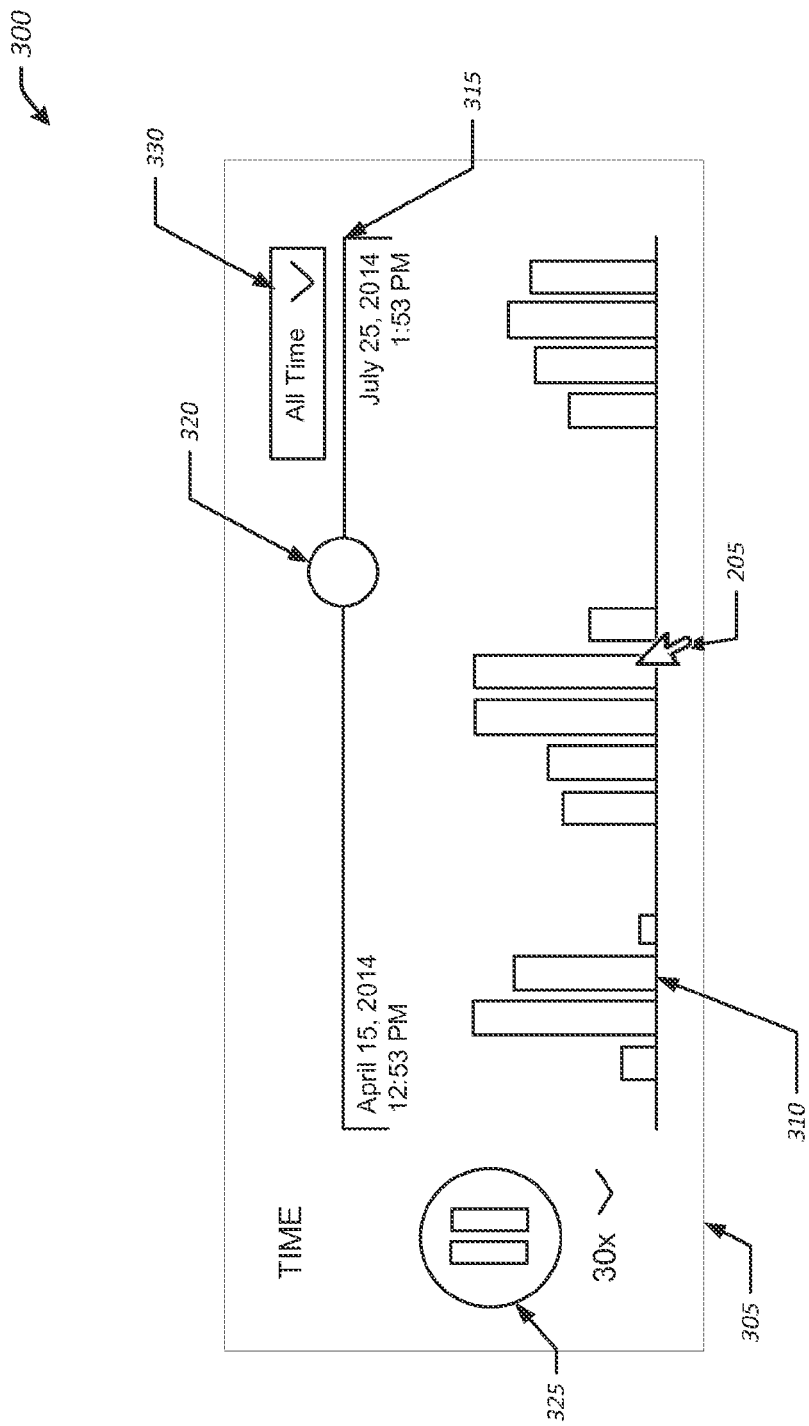
FIGS. 3A-3B illustrate an example time window component of a graphical user interface in accordance with one or more embodiments of the disclosure.

FIG. 3A illustrates an example time window component 300 of a graphical user interface depicting automatically binned information in accordance with one or more embodiments of the disclosure. A time window may be a sub-range of a time range and may have one or more metrics associated with the window. In some embodiments, a time window may be referred to as a data bin. In the example time window component 305, multiple graphical representations 310 of time windows are depicted. Each graphical data representation 310 may be associated with at least one metric value. In some embodiments, the metric value may correspond to a size of the graphical representation 310. For example, if a metric value was high, then the graphical representation may be taller than a graphical representation associated with a lower metric value. In some embodiments, each time window may be associated with multiple metric values. In some embodiments, the metric value associated with the time window corresponding to the size of the graphical representation may be specified by a user or may be selected by the system depending on one or more rules (e.g., the metric that has the most measurements, the metric with the most recently obtained data, etc.) Each time window represents a sub-range of time within the specified time range. The time range may be displayed in relation to the graphical representations 310. For example, the time range depicted on the dashboard 300 ranges from Apr. 15, 2014 at 12:53 PM to Jul. 25, 2014 at 1:53 PM. The dashboard may also include a slider 315 that represents the range of time depicted in the dashboard 300. Along the slider 315 is a handle 320. The handle may indicate a time position within the time range represented by the slider 315. In some embodiments, the slider 315 and handle 320 may be associated with a map component and/or a tile component (described in more detail with relation to FIGS. 4A-4B). In some embodiments, the window component 305 may include a pause/play button 325. The pause/play button may allow the user to let the handle 320 progress along the slider 315 at a pre-determined rate. Once a user selects the play/pause button, the handle 320 may progress along the slider 315 and the maps component 405 and the tiles component 415 may continuously update within the GUI to reflect the respective location and metrics associated with the current position of the handle 320 along the slider 315. The pause/play button 325 may be used in combination with a map component where the map component would advance a location indicator corresponding to the time represented by the handle's position on the slider 320. The map component may then display a location indicator that would advance along an identified path where one or more metrics were measured. In some embodiments, the dashboard 300 may include a time reset button 330. The time reset button may allow a user to reset the range of time to include the entire period of time in which metric values were measured, obtained, and/or calculated. If a user were to use the pointer 205 to select a time window 310, then the dashboard 300 may advance to FIG. 3B.

Figure 3B:
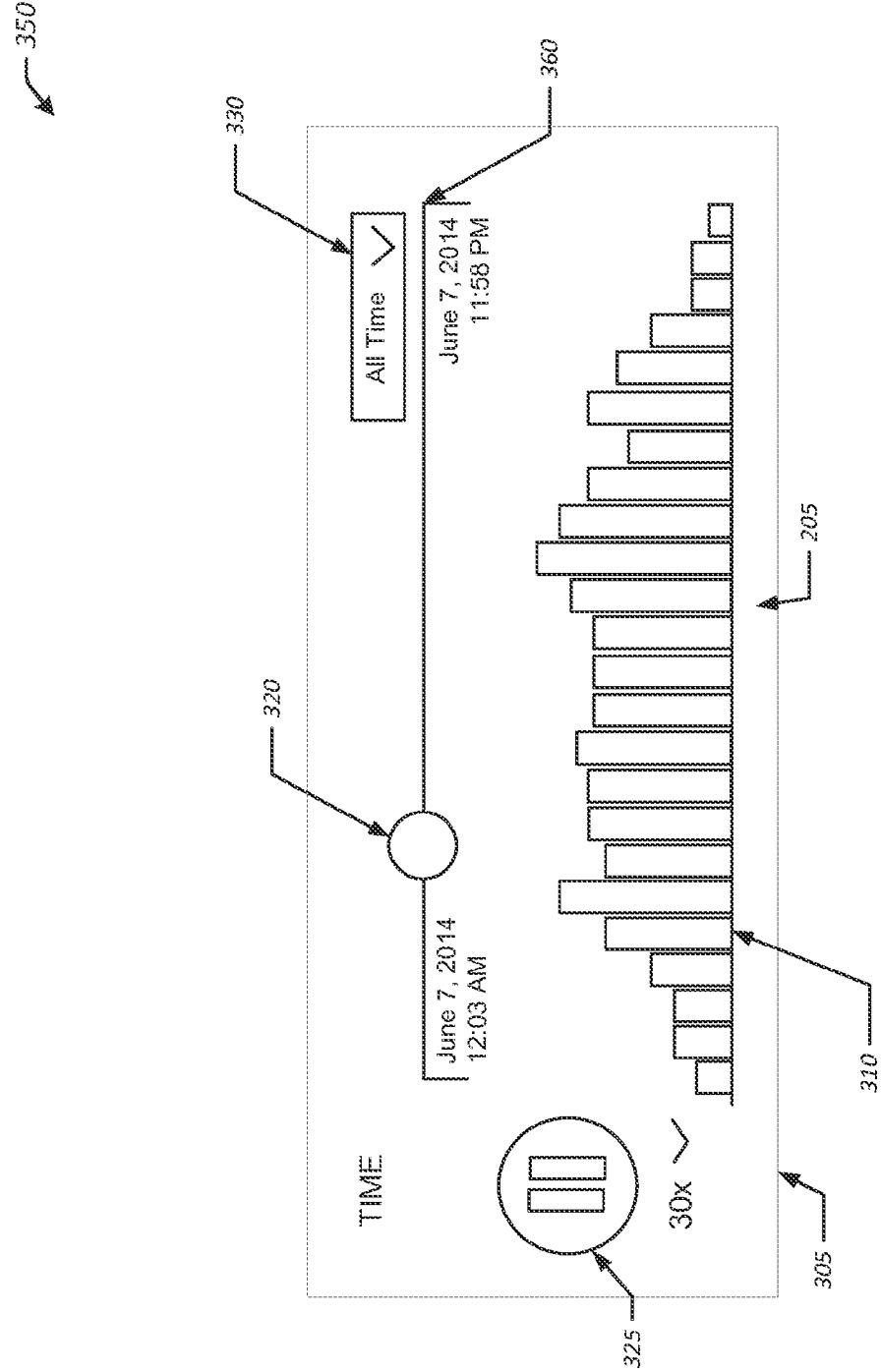

FIG. 3B illustrates an example time window component 300 of a graphical user interface depicting a re-binned information in accordance with one or more embodiments of the disclosure. As shown in the updated dashboard 350, the windows component 305 includes a new time range that corresponds to the selected time window. For example, the selected time range depicted in the updated dashboard 350 is Jun. 7, 2014 12:03 AM to Jun. 7, 2014 11:58 PM. Each of the graphical representations 310 of the time windows may be of a pre-determined measurement of time. For instance, in the updated dashboard 350, each time window may represent a 1-hour sub-range of time within the time period depicted. The time windows represented in the updated dashboard 350 represent a sub-set of time of a time window selected from FIG. 3A. For instance, in some embodiments, a user may use the pointer 205 to click on one of the graphical representations 310 of FIG. 3A, which would cause the dashboard 300 to be updated to dashboard 350 to update the graphical representations to be indicative of a sub-set of time of the clicked graphical representation 310. The dashboard may be updated again with the selection of a graphical representation of the updated dashboard 350, where the information would be re-binned, or further segregated by another pre-determined measurement of time, such as a 60-minute sub-range of time within the time range selected.

Figure 4A:
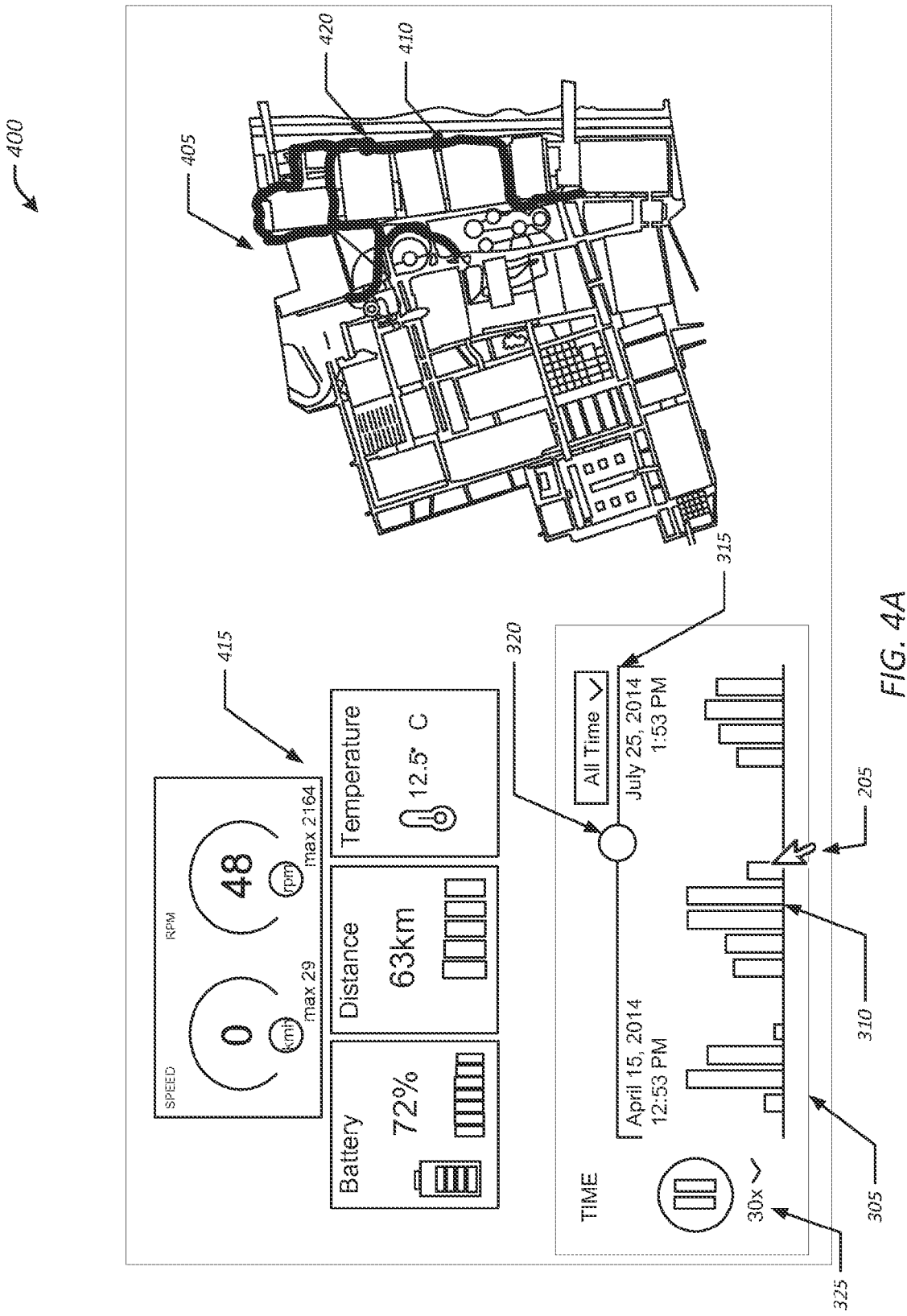
FIGS. 4A-4B illustrate an example graphical user interface for displaying automatically binned information in accordance with one or more embodiments of the disclosure.

FIG. 4A illustrates an example dashboard 400 for displaying automatically binned information in accordance with one or more embodiments of the disclosure. The dashboard 400 is a graphical user interface that may include a time window component 305, a map component 405, and a tiles component 415. In some embodiments, the time window component 305 may be a time window component as described in relation to FIG. 3A. The map component 405 may include a path 410 that indicates multiple locations where metrics were measured or otherwise obtained. A location indicator 420 may be used to indicate a specific location on the depicted path 410. In some embodiments, the location indicator 420 may be linked to the handle 320, where the handle indicates a specific time within a time range and the location indicator 420 may depict the corresponding location where metrics were obtained at the time indicated by the handle. In some embodiments, a user may use a pointer 205 to adjust the handle 320 along the slider 315. Adjusting the handle 320 may cause the position of the location indicator of the map component 405 to simultaneously update. In some embodiments, if the location indicator 420 is adjusted by the user, the handle 320 may also be updated to reflect a corresponding change in time to the location.

Additionally, in some embodiments, pause/play button 325 may be used to initiate the automated progression of the handle 320 along the slider 315. In some embodiments, the map component 405 may also update to depict a corresponding progression of the location indicator 420 along the path 410.

In some embodiments, the dashboard 400 may include a tiles component 415. The tiles component may depict additional metric values that may be associated with a given time window but not depicted by the graphical representation of the time window. For example, the graphical representations 310 of the time windows may represent metric, such as speed. However, the time window may be associated with multiple metrics, such as RPM (revolutions per minute), battery power metric, distance metric, and a temperature metric. In some embodiments, the multiple metrics associated with a time window may be depicted in tiles in a tile component 415, or other graphical representations, such as one or more bar charts displayed within or in association with a time window, where the metrics may be displayed in different embodiments. Examples of such embodiments may include multiple bar charts depicted in association with a time window, each corresponding to a metric associated with the time window, a bar chart depicting multiple metrics associated with a time window, superimposed bar charts depicting multiple metrics, or grouped bar charts depicting binned or grouped metrics for each time window. In some embodiments, the metrics may be depicted in a graphical user interface as a bar chart, line graph, pie chart, histogram, tree chart, flow chart, cartogram, tree map, waterfall chart, bubble chart, or any other type of graphical representation of data.

As mentioned, each of the different metrics may be depicted in its own tile within the tile component of the dashboard 400. As the information is updated (e.g., new location selected via the map component 405 or new time selected via the handle 320 of the time window component 305) the data depicted in the tile component 415 may be updated to reflect the metric values corresponding to the respective time and/or location position.

Figure 4B:
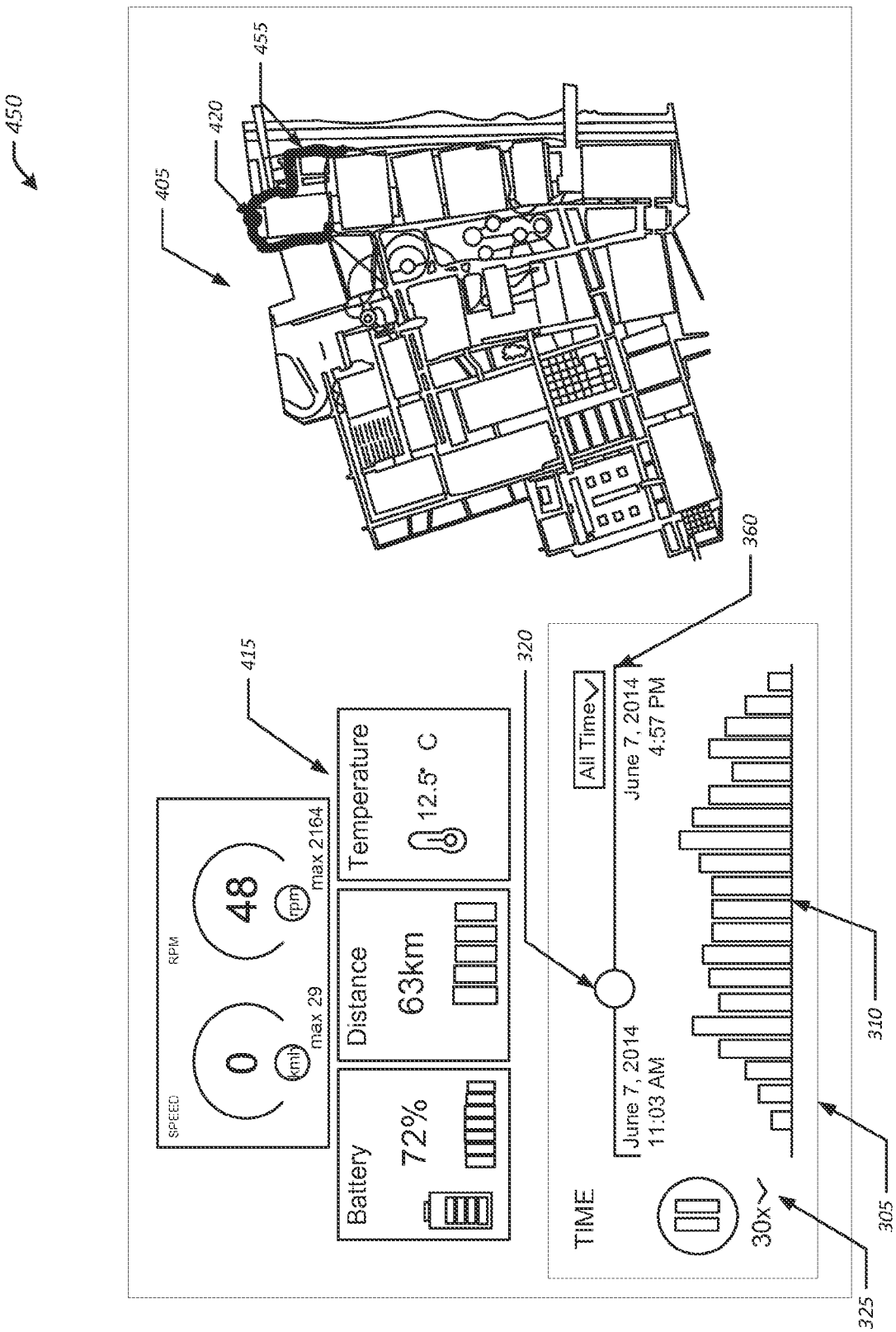

If a user uses a pointer 205 to select a graphical representation 310 of the time window, then the dashboard may be updated to reflected an updated time window component 305 and map component 405 as depicted in FIG. 4B.

FIG. 4B illustrates an example updated dashboard 450 for displaying automatically re-binned information in accordance with one or more embodiments of the disclosure. As shown, the time range depicted in the time window component has been adjusted to a smaller time range (e.g., time range in FIG. 4B reflects 1 day, whereas time range of FIG. 4A reflects approximately 3 months). The graphical representations of the time windows have been adjusted to represent a pre-determined time period of 1 hour. Additionally, the path depicted in the map component 405 may indicate the locations where metrics were measured and/or obtained during the adjusted time range. If a user were to select one of the graphical representations of a time window from the time window component 305, then the dashboard 450 would once again be updated to adjust the time range of the time window component, update the graphical representations of the time windows using a new pre-determined time period, and to update the map component to update the path where the metrics were measured to correspond to the new time range. Thus, the binning and re-binning of information may be iterative until the time windows can no longer be adjusted to be smaller sub-ranges. In some embodiments, the time reset button 330 may be used to update the dashboard to the largest time range or may be used to reset the dashboard to the use of a previous pre-determined time period.

In some embodiments, a user may select a portion of the map component 405, which may initiate an update of information to the time window component 305 and/or the tiles component 415. For example, selection of a portion of the path 410 by a user using the location indicator 420 may initiate an update to the time window component 305 to reflect the one or more metrics associated with the location of the location indicator 420. Similarly, selection of a portion of the path 410 by a user using the location indicator 420 may initiate an update to the tiles component 415 to reflect the one or more metrics associated with the location of the location indicator 420.

Figure 5:
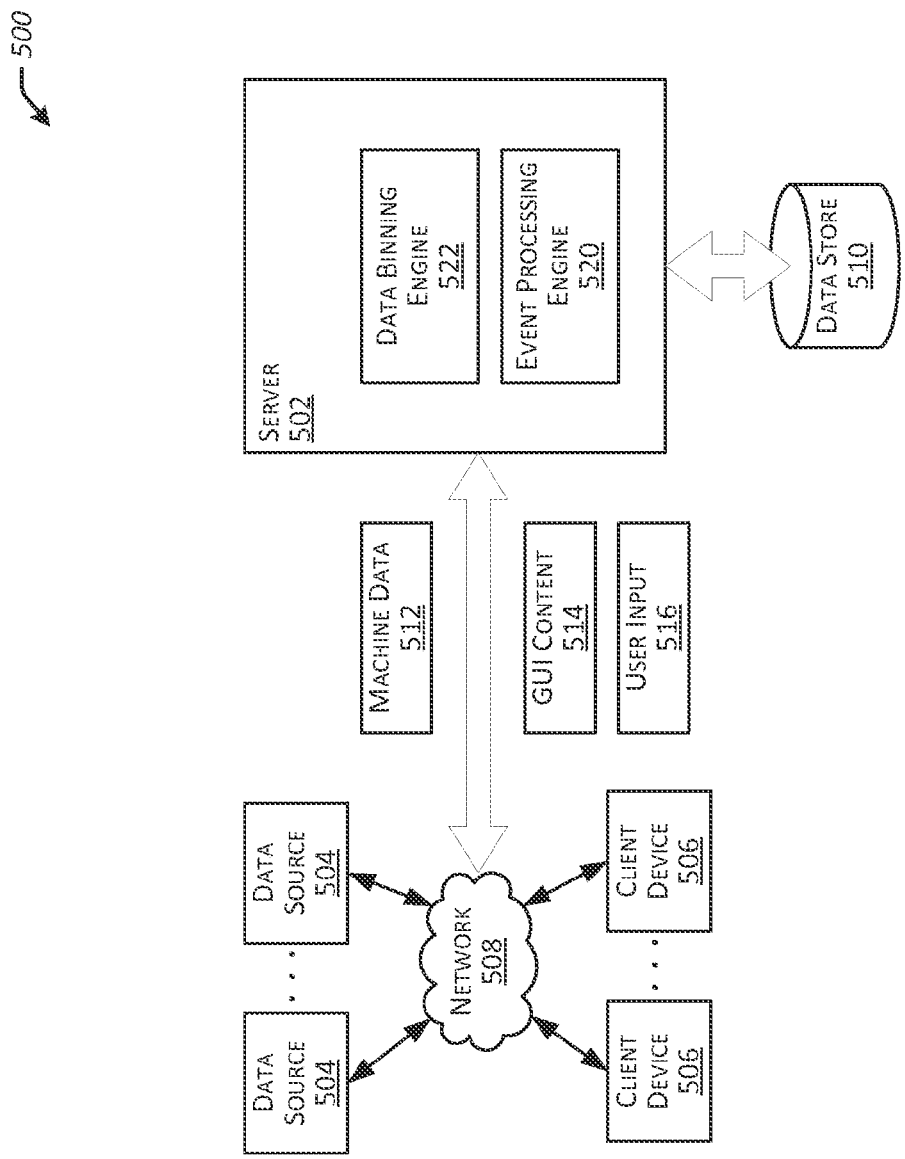
FIG. 5 is a block diagram of an example environment for automatically binning information in accordance with one or more embodiments of the disclosure embodiments.

FIG. 5 is a block diagram of an example environment ("environment") 500 automatically binning information in accordance with the disclosed embodiments. Environment 500 may include a server 502, one or more data sources 504, and/or one or more client devices 506 communicatively coupled via a network 508. The server 502 may include or otherwise have access to a data store 510.

The network 508 may include an element or system that facilitates communication between entities of the environment 500 (e.g., including the server 502, the data sources 504, and/or client devices 506). For example, the network 508 may include an electronic communications network, such as the Internet, a local area network ("LAN"), a wide area network ("WAN"), a wireless local area network ("WLAN"), a cellular communications network, and/or the like. In some embodiments, the network 508 may include a wired or a wireless network. In some embodiments, the network 508 may include a single network or a combination of networks.

The client devices 506 may include any variety of electronic devices, such as computer devices. In some embodiments, a client device 506 may include a device capable of communicating information via the network 508. A client device 506 may include one or more computer devices, such as a desktop computer, a server, a laptop computer, a tablet computer, a wearable computer device, a personal digital assistant (PDA), a smart phone, and/or the like. In some embodiments, a client device 506 may be a client of the server 502. In some embodiments, a client device 506 may include various input/output (I/O) interfaces, such as a graphical user interface (e.g., a display screen), an audible output user interface (e.g., a speaker), an audible input user interface (e.g., a microphone), an image acquisition interface (e.g., a camera), a keyboard, a pointer/selection device (e.g., a mouse, a trackball, a touchpad, a gesture detection or capture device, a touchscreen, a stylus or the like), and/or the like. In some embodiments, a client device 506 may include general computing components and/or embedded systems optimized with specific components for performing specific tasks. In some embodiments, a client device 506 may include programs/applications that may be used to generate a request for content, to provide content, to render content, and/or to send and/or receive requests to and/or from other devices via the network 508, such as client applications used for communicating with the server 502. For example, a client device 506 may include an Internet browser application that facilitates communication with other entities of the environment 500 via the network 508. In some embodiments, a program, or application, of a client device 506 may include modules having program instructions that are executable by a computer system to perform some or all of the functionality described herein with regard to at least the client devices 506. In some embodiments, a client device 506 may include one or more computer systems similar to that of computer system 2000 described below with regard to at least FIG. 18.

The data sources 504 may include one or more external data sources, such as servers, computers, routers, databases, operating systems, applications and/or the like that provide machine data 512. The machine data 512 may include raw data, which may include unstructured data, machine data, performance measurements or other time-series data, such as data obtained from web logs, system logs, network packets, application data, virtual machine data, or sensor readings. In some embodiments, the machine data 512 may include data provided by an operating system's performance software executing on a machine, and/or provided by a hypervisor (or virtual machine monitor (VMM)) associated with a virtual machine. In the context of the Microsoft Exchange.TM. service, for example, a Windows Performance Monitor application may provide over 200 parameters (or "counters") that are indicative of system performance. In some embodiments, a data source 504 is the same or similar to the data sources 1105 described below with regard to at least FIG. 11.

The server 502 may include any computing devices having network connectivity and capable of providing one or more services to network clients, such as the client devices 506 and/or the data sources 504. These services may include storage and/or processing of data. The server 502 may serve client requests received from the user devices 108 by processing the requests, searching, or querying, the data store 510 to identify search results, serving content (e.g., graphical user interface (GUI) content 514) corresponding to the search results to client devices 506 and/or process user input 516 (e.g., user selection of a portion of the displayed content 514).

In at least certain embodiments, the server 502 may be a high performance, scalable server configured to index and search machine data in real time. The server 502 may be operable with data generated by any application, server, or data processing device and may be configured to access, process, and index streaming machine data and also handle search requests. In addition, the server 502 may include an application server providing web interface adapted to search and navigate IT data and to manage deployment of applications through a browser interface. The server 502 may include an external communication interface configured to receive streams of machine data 512 from a plurality of different data sources 504 via network 508. Although certain embodiments are described with regard to a single server for the purpose of illustration, embodiments may include employing multiple servers, such as a plurality of distributed servers. In some embodiments, the server 502 may include one or more computer systems similar to that of computer system 2000 described below with regard to at least FIG. 18.

The data store 510 may include a medium for the storage of data thereon. For example, the data store 510 may include a non-transitory computer-readable medium storing data thereon that is accessible by various entities of the environment 500, such as server 502. Although certain embodiments are described with regard to a single data store 510 for the purpose of illustration, embodiments may include employing multiple data stores 510, such as a plurality of distributed data stores 510. In some embodiments, a data store 510 is the same or similar to the data stores 1103 described below with regard to at least FIG. 11.

In some embodiments, the server 502 may include an event processing engine 520, and/or and a service analyzer engine 522. The event processing engine 520 may provide for the receipt of machine data 512, the processing of machine data 512 (e.g., minimal processing to identify events contained in or otherwise associated with the machine data 512) the storage of corresponding data (e.g., the storage of the identified events in data store 510) and/or performing searching of the stored data to identify search results (e.g., events) responsive to a search query. For example, the event processing engine 520 may receive machine data 512 from one or more of the data sources 504, the event processing engine 520 may conduct minimal processing on the machine data 512, and may store the minimally processed machine data 512 in the data store 510. The machine data 512 received (or the minimally processed machine data 512) may be provided, for example, to the data binning engine 522 for use in generating corresponding automatically binned information that may be used, for example, to populate dashboards 100, 300 and/or 400.

The data binning engine 522 may provide for the generation and display of graphical user interfaces (GUI) for presenting automatically binned information to users. For example, the data binning engine 522 may identify and/or generate information (e.g., including time periods, time ranges, time windows, etc.), generate dashboards 100, 300, 350, 400, and/or 450 including the automatically binned information, and serve GUI content including the dashboard 100, 300, 350, 400, and/or 450 to a client device 506 for display to a user. In some embodiments, the data binning engine 522 may process the user input 516 received from a client device 506 (e.g., selection of an element of a dashboard), and may identify and serve corresponding GUI content to the client device 506 for display to a user.

Figure 6:
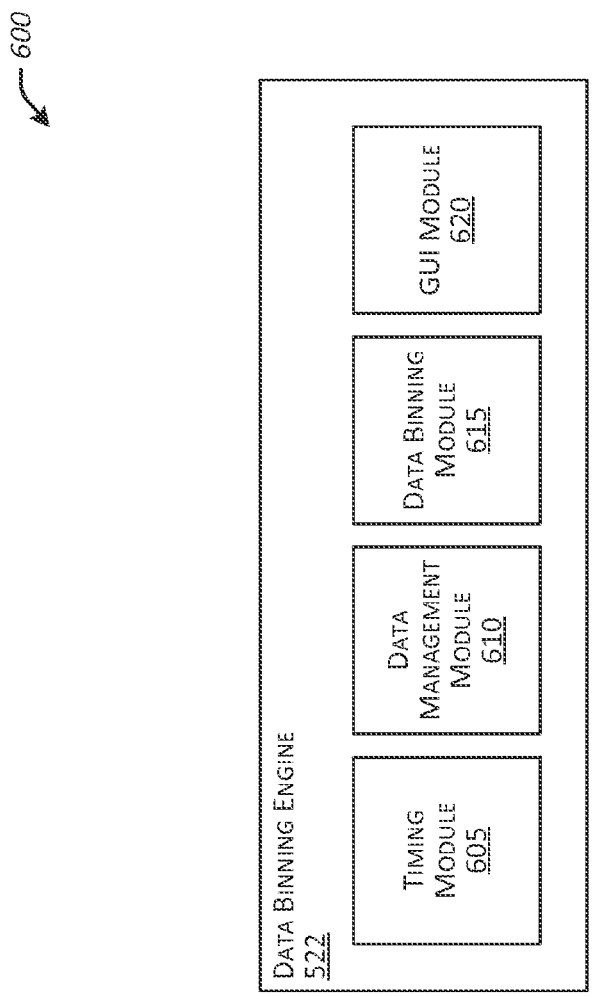
FIG. 6 is a block diagram that illustrates example modules of a data binning engine in accordance with one or more embodiments of the disclosure.

FIG. 6 is a block diagram that illustrates example modules of data binning engine 522 in accordance with the disclosed embodiments. Data binning engine 522 may include, for example, a timing module 605, a data management module 610, a data binning module 615, and a graphical user interface (GUI) module 620. Each of the modules may include software modules that may be employed to perform some or all of the functionality of the data engine 522 as described herein (e.g., with regard to at least FIGS. 7-10).

Illustrative Processes

Figure 7:
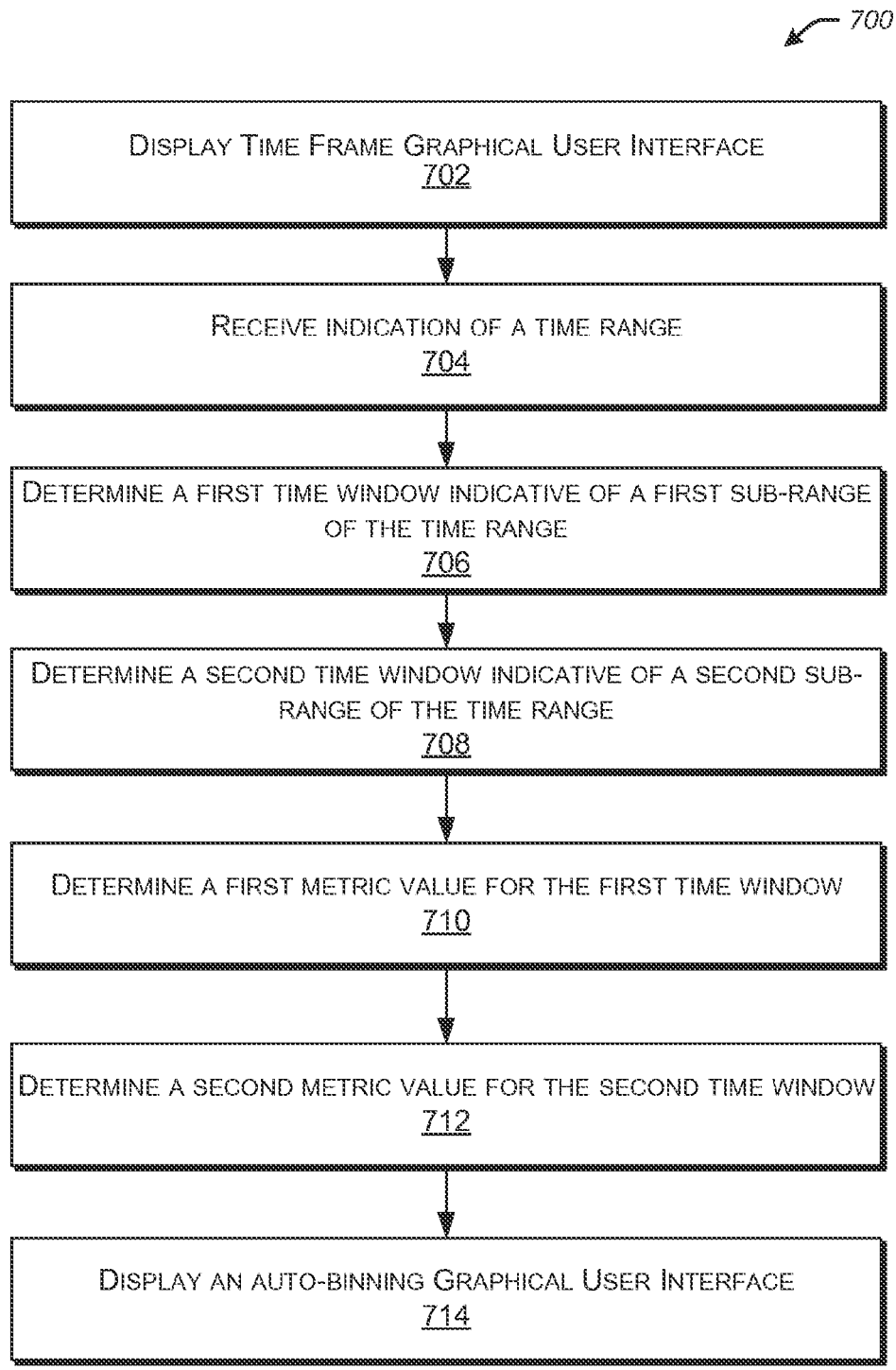
FIG. 7 is a flowchart that illustrates an example method for displaying a graphical user interface for automatically binned information in accordance with one or more embodiments of the disclosure.

FIG. 7 is a flowchart that illustrates an example method 700 for displaying a graphical user interface for automatically binned information in accordance with one or more embodiments of the disclosure. At block 702, a time frame GUI may be displayed. In some embodiments, the GUI module 620 may facilitate display of the time frame GUI. In some embodiments, the time frame GUI may be similar to the dashboard depicted in FIG. 1. The time frame GUI may include a period of time for which data was measured, obtained, and/or calculated. In some embodiments, the period of time may reflect all of the times where data was measured, obtained, and/or calculated. In some embodiments, the period of time may reflect a pre-determined period of time. At block 704, an indication of a time range is received. In some embodiments, the time range indication may be received from the time frame GUI, where the time range is specified by a user interacting with one or more graphical elements of the time frame graphical user interface. For example, the time frame may be specified through a process similar to that described in relation to FIG. 2. In some embodiments, the GUI module 620 may receive an indication of a selection of a time range via the time frame GUI. In some embodiments, the time range may be received from a user through a non-graphical user interface. For example, the time range may be received via a command line or through text fields specifying a start date and an end date or a start date and a duration of a time range (e.g., 35 days). In some embodiments, the timing module 605 may generate and/or select one or more pre-determined measurements of time based on the time range received from the user. In some embodiments, the timing module 605 may be used to identify a duration of each time window within a time range.

At block 706, a first time window indicative of a first sub-range of the time range may be determined and at block 708, a second time window indicative of a second sub-range of the time range may be determined. The first time window and the second time window may be determined using a pre-determined measurement of time. In some embodiments, the data binning module 615 may receive one or more pre-determine measurements of time from the timing module 605 and may determine multiple time windows within an identified time range. For example, if the time range spans multiple months, then the first time window and the second time window may be determined using a pre-determined measurement of time, such as a 24 hour time period. As described in FIG. 3A, a time window may be indicative of a sub-range of the time range. Each time range may be indicative of a different non-overlapping sub-range within the time range.

At block 710, a first metric value for the first time window may be determined and at block 712, a second metric value for the second time window may be determined. In some embodiments, the data binning module 615 may determine the metric values associated with time windows. In some embodiments, metrics values may be obtained from activity logs, error logs, configuration files, network packets, application data, virtual machine data and/or database records. Multiple metric values may be measured for any single point in time. In some embodiments, metric values may be measured using one or more sensors associated with a device. For example, for a vehicle, values for a speed metric, battery power level metric, a revolutions per minute metric, and/or a temperature metric may be measured and stored. In some embodiments, metric values may be obtained from a set of field values extracted from events of raw machine data associated with a given sub-range. In some embodiments, raw machine data may include aggregated heterogeneous machine data generated by one or more servers, one or more databases, one or more applications, one or more networks, or any combination thereof. In some embodiments, field values may be extracted from the events based at least in part on a real-time search query. For example. field values may be extracted from the events in response to a user conducting a real-time search query of raw machine data.

In some embodiments, the data binning module 615 may determine a first metric value by using the first set of field values extracted from the events of raw machine data associated with the first sub-range and the second metric value is further determined by using the second set of field values extracted from the events of raw machine data associated with the second sub-range. Examples of determining the first and second metric values may include, but are not limited to, averaging the values within the sub-range, identifying a median value within the sub-range, identifying a highest value of the sub-range, and/or identifying a lowest value of the sub-range.

In some embodiments, the first metric value and the second metric value are then associated with the first time window and the second time window, respectively.

At block 714, an auto-binning GUI may be displayed. The auto-binning GUI may include a time window component 305 comprising a graphical element representing the first metric value of the first time window and a second graphical element representing the second metric value of the second time window, as discussed in FIGS. 3A-3B, and 4A-4B. In some embodiments, the size of the graphical elements may correspond to their respective associated metric values. For example, if the first metric value is greater than the second metric value, the graphical representation of the first metric value may be taller than the graphical representation of the second metric value.

Figure 8:
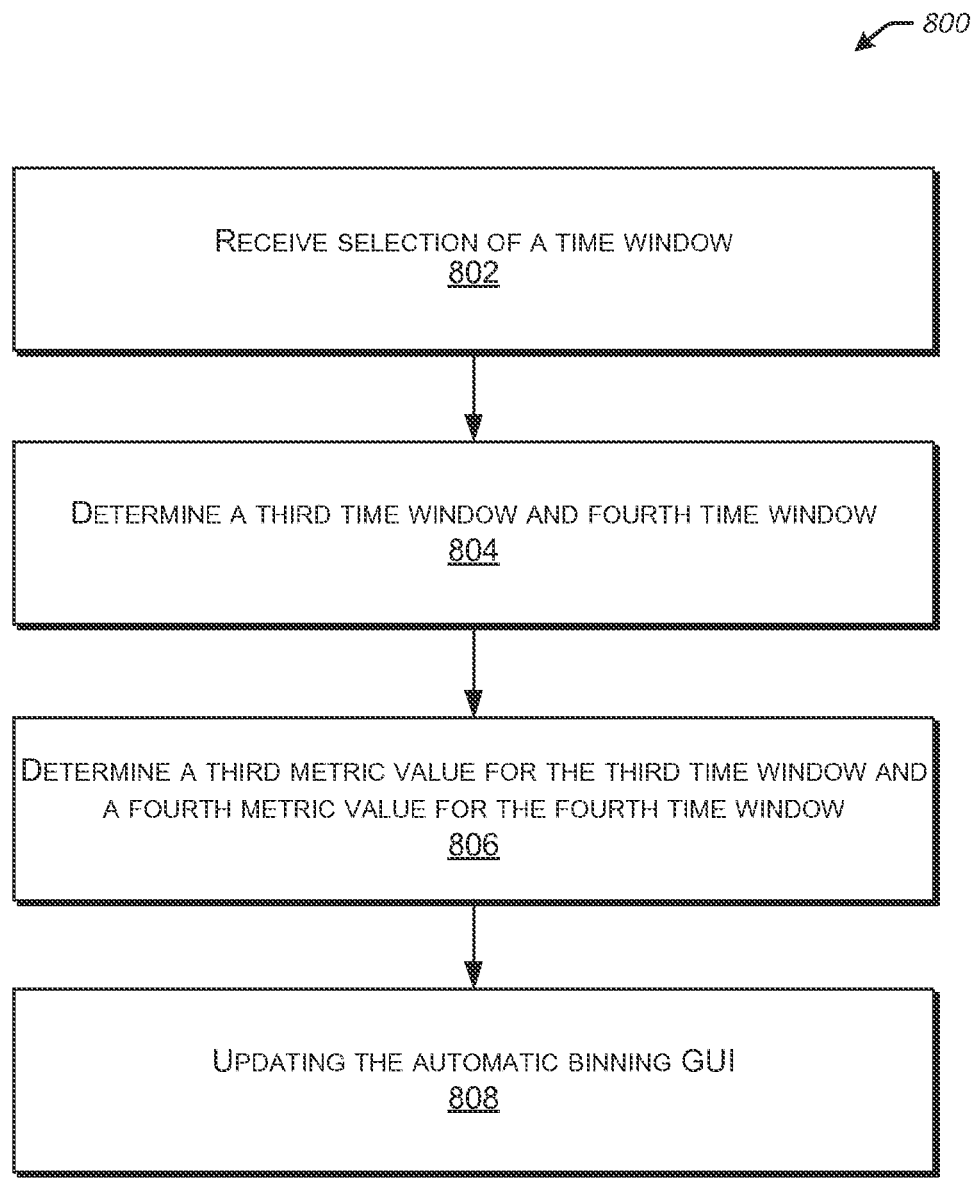
FIG. 8 is a flowchart that illustrates an example method for displaying a graphical user interface for automatically re-binned information in accordance with one or more embodiments of the disclosure.

FIG. 8 is a flowchart that illustrates an example method 800 for displaying a graphical user interface for automatically re-binned information in accordance with one or more embodiments of the disclosure. At block 802, a selection of a time window may be received. In some embodiments, the GUI module 620 may receive an indication of the selection of a graphical representation of a time window. The GUI module 620 may determine, based at least in part on the selection, a pre-determined measurement of time to use in generating the third time window and the fourth time window. In some embodiments, the pre-determined measurement of time is less than the pre-determined measurement of time described in relation to FIG. 7. For example, in FIG. 7, the pre-determined measurement of time may be a 24-hour period. A selection of a time window representing a 24-hour time period may be used by the GUI module 620 to select a pre-determined measurement of time of 1-hour time periods for the third time window and the fourth time window.

At block 804, a third time window indicative of a third sub-range of the first-sub-range may be determined and a fourth time window indicative of a fourth sub-range of the first sub-range may be determined. The GUI module 620 may determine the third time window and the fourth time window using the pre-determined measurement of time described in relation to block 802.

At block 806, a third metric value for the third time window and a fourth metric value for the fourth time window may be determined by the data binning module 615. As discussed in relation to FIG. 7, multiple metrics may be measured for any single point in time. In some embodiments, metrics may be measured using one or more sensors associated with a device. For example, for a vehicle, values for a speed metric, battery power level metric, a revolutions per minute metric, and/or a temperature metric may be measured and stored. In some embodiments, metrics may be obtained from a set of field values extracted from events of raw machine data associated with a given sub-range. In some embodiments, the data management module 610 may facilitate measurement, storage and/or retrieval of metric values. In some embodiments, the third metric value and the fourth metric value may be determined using the same process or calculation as used in blocks 710 and 712 for the first metric value and the second metric value. In some embodiments, the third metric value may be determined by using the third set of field values extracted from the events of raw machine data associated with the third sub-range and the fourth metric value may be further determined by using the fourth set of field values extracted from the events of raw machine data associated with the fourth sub-range. Examples of determining the third and fourth metric values may include, but are not limited to, averaging the values within the sub-range, identifying a median value within the sub-range, identifying a highest value of the sub-range, and/or identifying a lowest value of the sub-range. In some embodiments, the third metric value and the fourth metric value are then associated with the third time window and the fourth time window, respectively.

At block 808, the automatic binning GUI may be updated. In some embodiments, the GUI module 620 may receive the third metric value and the fourth metric value associated with the third time window and the fourth time window, respectively, and may update the time window component of the GUI to display a graphical representation of the third metric value and a graphical representation of the fourth metric value. In some embodiments, the size of the graphical representations may correspond to the metric value.

Figure 9:
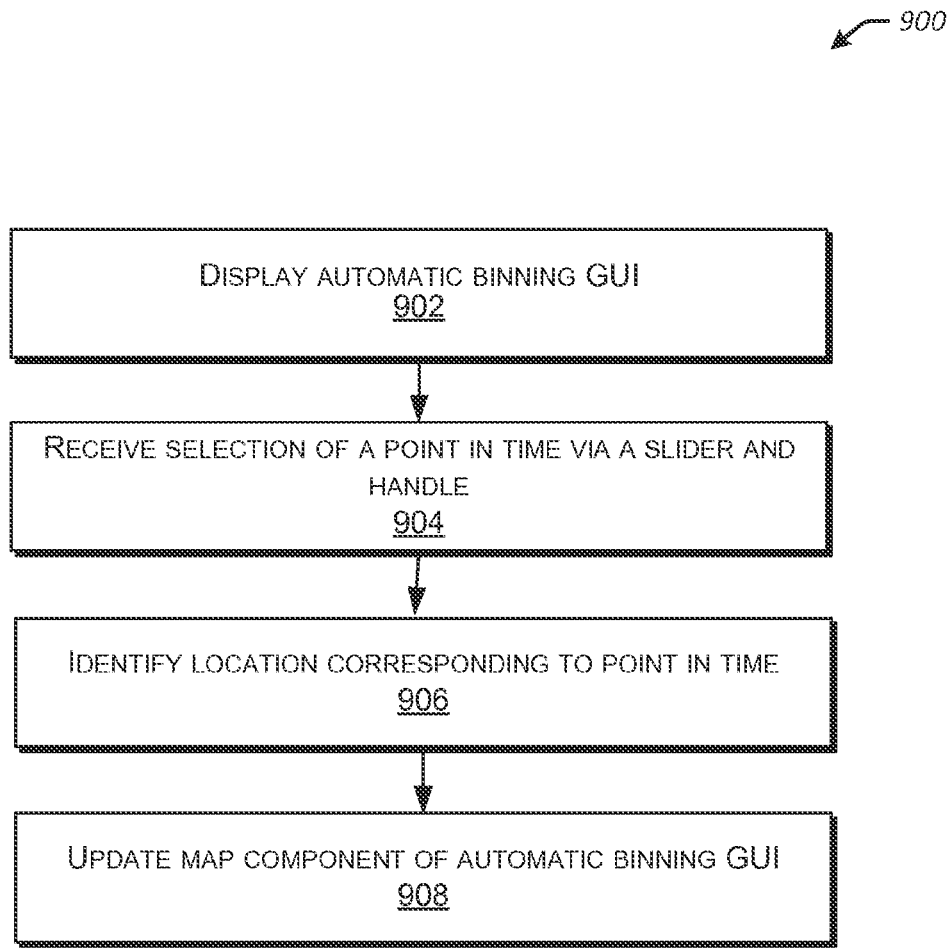
FIG. 9 is a flowchart that illustrates an example method for updating a map component of a graphical user interface for automatically binned information in accordance with one or more embodiments of the disclosure.

FIG. 9 is a flowchart that illustrates an example method 900 for updating a map component 405 of a graphical user interface for automatically binned information in accordance with one or more embodiments of the disclosure. At block 902, the automatic binning GUI may be displayed. In some embodiments, the GUI module 620 may facilitate generation and presentation of a time window component 305 and a maps component 405. In some embodiments, a location indicator 415 may be shown on a path of a map to indicate a location on the map.

At block 904, a selection of a point in time may be received via a slider and a handle. In some embodiments, the GUI module 620 may receive input via the slider 315 and the handle 320. The handle may indicate a specific point in the time period represented by the slider 315.

At block 906, a location corresponding to the point in time may be identified. In some embodiments, the GUI module 620 may identify the location corresponding to the point in time identified via the slider 315 and the handle 320. The GUI module 620 may communicate with the data management module 610 and may retrieve a location corresponding to the time identified.

At block 908, the map component 405 of the automatic binning GUI may be updated. In some embodiments, the GUI module 615 may update the position of the location indicator 420 on the map component 405 of the automatic binning GUI.

Similarly, the location indicator 420 in the maps component 405 may be moved along an identified path 410 along which metrics were obtained. In some embodiments, a user may adjust the position of the location indicator 420 in the maps component 405 of the dashboard 400. Metrics corresponding to the new position of the location indicator 420 may be determined. The dashboard 400 may be updated to reflect the newly determined information. For example, the time window component 305 may be updated to indicate data reflecting the newly determined location, such as by moving the handle 320 along the slider 315 to a time position that corresponds to the position of the location indicator 420. Additionally, in some embodiments, the tiles component 415 may be updated to reflect the one or more metrics associated with the new position of the location indicator 420.

Figure 10:
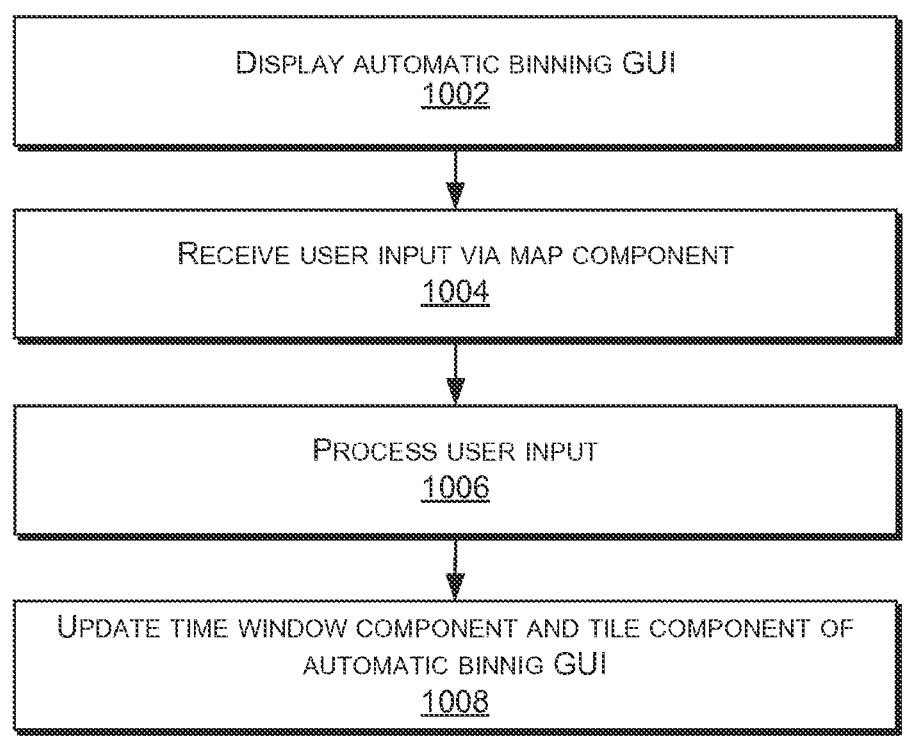
FIG. 10 is a flowchart that illustrates an example method for updating a time window component and a tile component of a graphical user interface for automatically binned information in accordance with one or more embodiments of the disclosure.

FIG. 10 is a flowchart that illustrates an example method 1000 for updating a time window component 305 and a tile component 415 of a graphical user interface 400 for automatically binned information in accordance with one or more embodiments of the disclosure. At block 1002, the automatic binning GUI may be displayed. In some embodiments, the GUI 400 may include a time window component 305, a map component 405, and a tile component 415, each generated by the GUI module 620. The time window component 305 may include a slider 360 indicative of a time period and a handle 320 indicative of a point of time of the time period. The map component 405 may include a location indicator 420 that indicates a location on the map. In some embodiments, the location indicator 420 may correspond to the handle 320, which indicates a time position along the slider 360. The tile component 415 may include one or more tiles that depict additional metrics that were captured, obtained, and/or calculated at the time indicated by the handle 320.

At block 1004, user input may be received via the map component 405. In some embodiments, the GUI module 620 may receive the indication of user input via a graphical user interface, such as 400. In some embodiments, the user input may be a location on the map component 405 indicated by the position of the location indicator 420. The user may have moved the location indicator 420 on the map component 405 along the path 455 indicated on the map component. The path 455 may indicate a series of locations on the map where metrics were measured during the time period indicated by the slider 360 of the time window component 305.

At block 1006, the user input may be processed. The GUI module 620 may receive the user input and identify a location corresponding to the location indicator 420. In some embodiments, the GUI module 620 may determine a time associated with the indicated location. In some embodiments, the GUI module 620 may retrieve and/or calculate additional metrics associated with the identified time.

At block 1008, the time window component 305 and/or the tile component 415 of the automatic binning GUI 400 may be updated. In some embodiments, the GUI module 620 may update the handle 320 position along the slider 315 using the identified time corresponding to the indicated location of the location indicator 420. In some embodiments, the GUI module 620 may update the tile component 415 to reflect the additional metrics associated with the identified time.

As described above, in some instances, the automatically binned information may be based on data, or source data, received from one or more external data sources, such as servers, computers, routers, databases, operating systems, applications and/or the like. The source data may include raw data, which may include unstructured data, machine data, performance measurements or other time-series data, such as data obtained from web logs, system logs, application data, virtual machine data, network packets, or sensor readings. In some embodiments, the automatically binned information may include or be based on data provided by an operating system, such as by an operating system's performance software executing on the machines associated with the service, and/or provided by a hypervisor (or virtual machine monitor (VMM)) associated with a virtual machine. Further, in some embodiments, the automatically binned information may include or be based on data that is retrieved from a data store or similar source. For example, in the context of a system that may store and access performance data, such as SPLUNK.RTM. ENTERPRISE system (described in more detail herein with regard to at least FIGS. 11-17D), the source data may include automatically binned data retrieved from a data store (e.g., of a performance data system) via one or more searches of the data store. In some embodiments, may include automatically binned data stored in a data store and may conduct searches or queries on the stored data (e.g., continually, in real-time) to identify and provide a stream of relevant data that may be used to generate, or otherwise determine machine metrics and/or other automatically binned information described herein. The following describes an example automatically binned data system that may be employed to provide automatically binned data for use in generating, or otherwise determining, machine metrics and/or other automatically binned information that may be used as the basis of the above described visualization of the automatically binned information, e.g., including the dashboards 100, 300, 350, 400 and 450, respectively.

1.1 Overview of Example Performance Data System

Modern data centers often comprise thousands of host computer systems that operate collectively to service requests from even larger numbers of remote clients. During operation, these data centers generate significant volumes of performance data and diagnostic information that may be analyzed to quickly diagnose performance problems. In order to reduce the size of this performance data, the data is typically pre-processed prior to being stored based on anticipated data-analysis needs. For example, pre-specified data items may be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time may be a challenging task. A data center may generate heterogeneous performance data from thousands of different components, which may collectively generate tremendous volumes of performance data that may be time-consuming to analyze. For example, this performance data may include data from system logs, network packet data, application data, virtual machine data, sensor data, and data generated by various applications. Also, the unstructured nature of much of this performance data may pose additional challenges because of the difficulty of applying semantic meaning to unstructured data, and the difficulty of indexing and querying unstructured data using traditional database systems.

These challenges may be addressed by using an event-based system, such as the SPLUNK.RTM. ENTERPRISE system produced by Splunk Inc. of San Francisco, Calif., to store and process performance data. The SPLUNK.RTM. ENTERPRISE system is the leading platform for providing real-time operational intelligence that enables organizations to collect, index, and harness machine-generated data from various websites, applications, servers, networks, and mobile devices that power their businesses. The SPLUNK.RTM. ENTERPRISE system is particularly useful for analyzing unstructured performance data, which is commonly found in system log files. Although many of the techniques described herein are explained with reference to the SPLUNK.RTM. ENTERPRISE system, the techniques are also applicable to other types of data server systems.

In the SPLUNK.RTM. ENTERPRISE system, performance data is stored as "events," wherein each event comprises a collection of performance data and/or diagnostic information that is generated by a computer system and is correlated with a specific point in time. Events may be derived from "time series data," wherein time series data comprises a sequence of data points (e.g., performance measurements from a computer system) that are associated with successive points in time and are typically spaced at uniform time intervals. Events may also be derived from "structured" or "unstructured" data. Structured data has a predefined format, wherein specific data items with specific data formats reside at predefined locations in the data. For example, structured data may include data items stored in fields in a database table. In contrast, unstructured data does not have a predefined format. This means that unstructured data may comprise various data items having different data types that may reside at different locations. For example, when the data source is an operating system log, an event may include one or more lines from the operating system log containing raw data that may include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources may be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK.RTM. ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK.RTM. ENTERPRISE system starts with raw data, which may include unstructured data, machine data, performance measurements or other time-series data, such as data obtained from web logs, system logs, network packets, application data, virtual machine data, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK.RTM. ENTERPRISE system facilitates using a late-binding schema while performing queries on events. A late-binding schema specifies "extraction rules" that are applied to data in the events to extract values for specific fields. More specifically, the extraction rules for a field may include one or more instructions that specify how to extract a value for the field from the event data. An extraction rule may generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema may be developed on an ongoing basis until the time a query is actually executed. This means that extraction rules for the fields in a query may be provided in the query itself, or may be located during execution of the query. Hence, as an analyst learns more about the data in the events, the analyst may continue to refine the late-binding schema by adding new fields, deleting fields, or changing the field extraction rules until the next time the schema is used by a query. Because the SPLUNK.RTM. ENTERPRISE system maintains the underlying raw data and provides a late-binding schema for searching the raw data, it enables an analyst to investigate questions that arise as the analyst learns more about the events.

In the SPLUNK.RTM. ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves may be created automatically. For example, such default fields may specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 11:
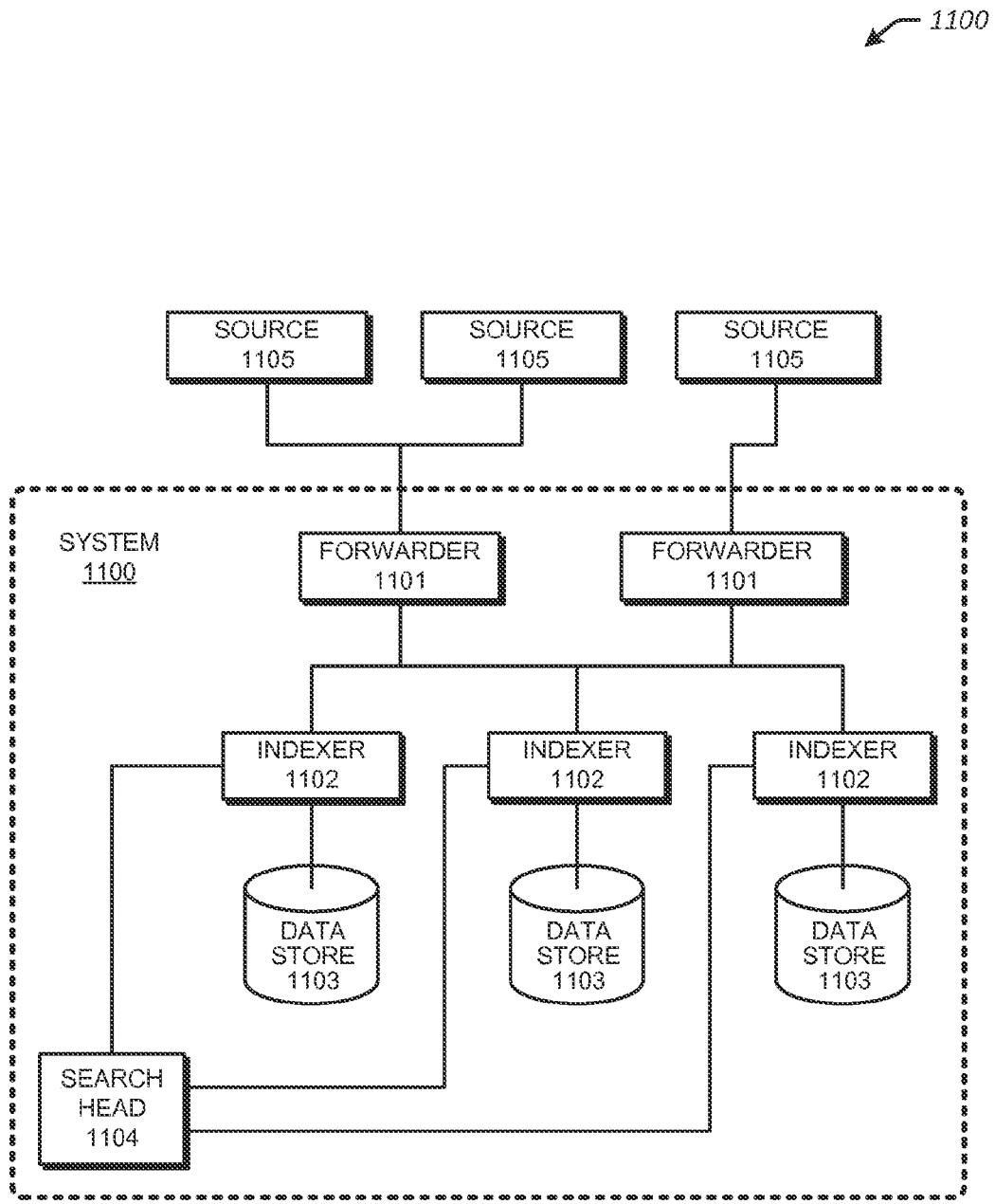
FIG. 11 presents a block diagram of an example event-processing system in accordance with one or more embodiments of the disclosure.

FIG. 11 presents a block diagram of an exemplary event-processing system 1100, similar to the SPLUNK.RTM. ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers may comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 may also perform operations to strip out extraneous data and detect timestamps in the data. The forwarders next determine which indexers 1102 will receive each data item and then forward the data items to the determined indexers 1102.

Note that distributing data across different indexers facilitates parallel processing. This parallel processing may take place at data ingestion time, because multiple indexers may process the incoming data in parallel. The parallel processing may also take place at search time, because multiple indexers may search through the data in parallel.

System 1100 and the processes described below with respect to FIGS. 11-15 are further described in "Exploring Splunk Search Processing Language (SPL) Primer and Cookbook" by David Carasso, CITO Research, 2012, and in "Optimizing Data Analysis with a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 12:
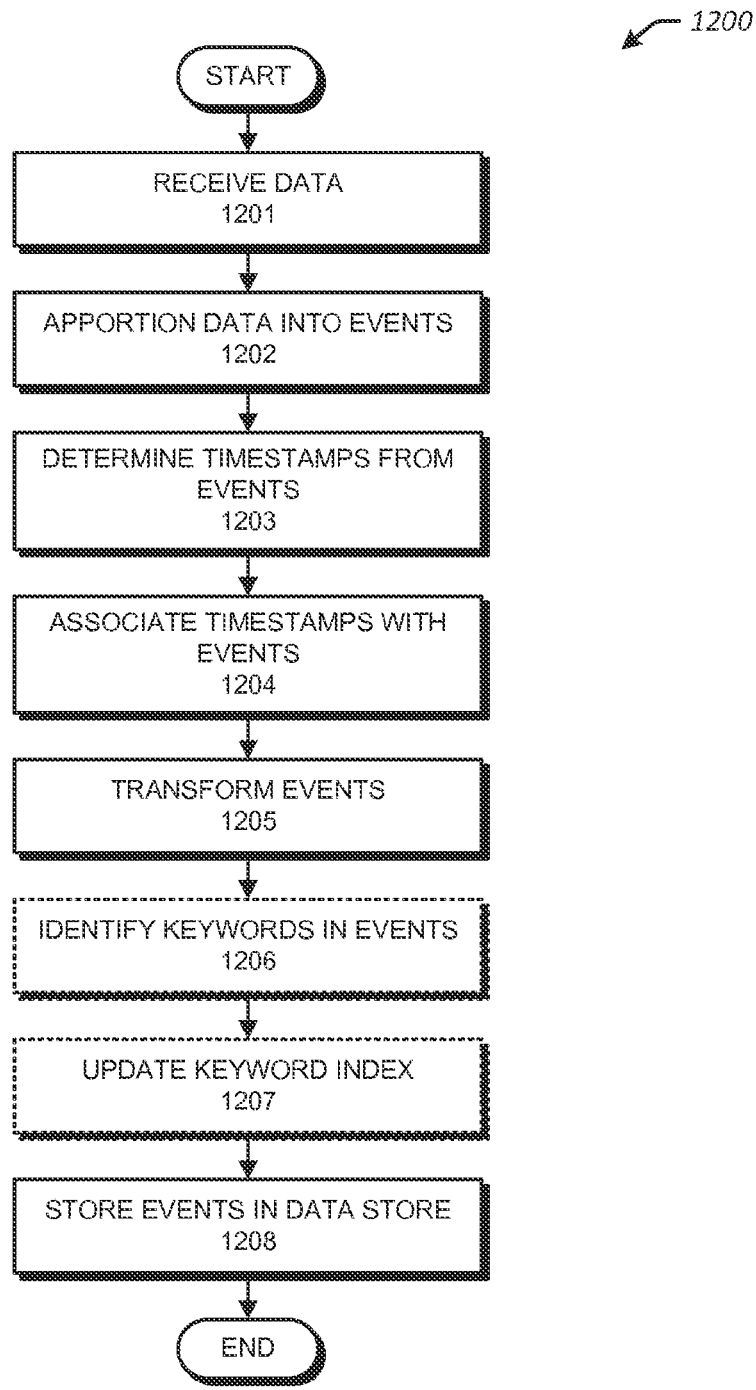
FIG. 12 presents a flowchart illustrating an example of how indexers process, index, and store data received from forwarders in accordance with one or more embodiments of the disclosure.

FIG. 12 presents a flowchart 1200 illustrating how an indexer processes, indexes, and stores data received from forwarders in accordance with the disclosed embodiments. At block 1201, the indexer receives the data from the forwarder. Next, at block 1202, the indexer apportions the data into events. Note that the data may include lines of text that are separated by carriage returns or line breaks and an event may include one or more of these lines. During the apportioning process, the indexer may use heuristic rules to automatically determine the boundaries of the events, which for example coincide with line boundaries. These heuristic rules may be determined based on the source of the data, wherein the indexer may be explicitly informed about the source of the data or may infer the source of the data by examining the data. These heuristic rules may include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user may fine-tune or configure the rules that the indexers use to determine event boundaries in order to adapt the rules to the user's specific requirements.

Next, the indexer determines a timestamp for each event at block 1203. As mentioned above, these timestamps may be determined by extracting the time directly from data in the event, or by interpolating the time based on timestamps from temporally proximate events. In some cases, a timestamp may be determined based on the time the data was received or generated. The indexer subsequently associates the determined timestamp with each event at block 1204, for example by storing the timestamp as metadata for each event.

Then, the system may apply transformations to data to be included in events at block 1205. For log data, such transformations may include removing a portion of an event (e.g., a portion used to define event boundaries, extraneous text, characters, etc.) or removing redundant portions of an event. Note that a user may specify portions to be removed using a regular expression or any other possible technique.

Next, a keyword index may optionally be generated to facilitate fast keyword searching for events. To build a keyword index, the indexer first identifies a set of keywords in block 1206. Then, at block 1207 the indexer includes the identified keywords in an index, which associates each stored keyword with references to events containing that keyword (or to locations within events where that keyword is located). When an indexer subsequently receives a keyword-based query, the indexer may access the keyword index to quickly identify events containing the keyword.

In some embodiments, the keyword index may include entries for name-value pairs found in events, wherein a name-value pair may include a pair of keywords connected by a symbol, such as an equals sign or colon. In this way, events containing these name-value pairs may be quickly located. In some embodiments, fields may automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp may be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events may be stored as flash memory instead of on hard disk.

Each indexer 1102 is responsible for storing and searching a subset of the events contained in a corresponding data store 1103. By distributing events among the indexers and data stores, the indexers may analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets may also be replicated across different indexers and data stores to facilitate high availability and disaster recovery as is described in U.S. patent application Ser. No. 14/266,812 filed on 30 Apr. 2014, which is hereby incorporated herein by reference in its entirety for all purposes, and in U.S. patent application Ser. No. 14/266,817 also filed on 30 Apr. 2014, which is hereby incorporated herein by reference in its entirety for all purposes.

1.4 Query Processing

Figure 13:
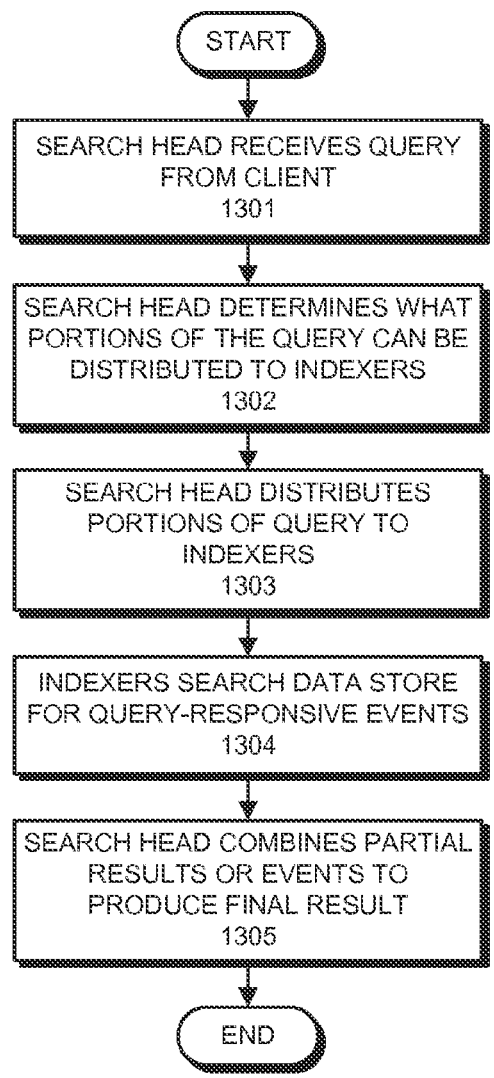
FIG. 13 presents a flowchart illustrating an example of how a search head and indexers perform a search query in accordance with one or more embodiments of the disclosure.

FIG. 13 presents a flowchart 1300 illustrating how a search head and indexers perform a search query in accordance with the disclosed embodiments. At the start of this process, a search head receives a search query from a client at block 1301. Next, at block 1302, the search head analyzes the search query to determine what portions may be delegated to indexers and what portions need to be executed locally by the search head. At block 1303, the search head distributes the determined portions of the query to the indexers. Note that commands that operate on single events may be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria may include matching keywords or specific values for certain fields. In a query that uses a late-binding schema, the searching operations in block 1304 may involve using the late-binding scheme to extract values for specified fields from events at the time the query is processed. Next, the indexers may either send the relevant events back to the search head, or use the events to calculate a partial result, and send the partial result back to the search head.

Finally, at block 1305, the search head combines the partial results and/or events received from the indexers to produce a final result for the query. This final result may comprise different types of data depending upon what the query is asking for. For example, the final results may include a listing of matching events returned by the query, or some type of visualization of data from the returned events. In another example, the final result may include one or more calculated values derived from the matching events.

Moreover, the results generated by system 1100 may be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head may also perform various operations to make the search more efficient. For example, before the search head starts executing a query, the search head may determine a time range for the query and a set of common keywords that all matching events must include. Next, the search head may use these parameters to query the indexers to obtain a superset of the eventual results. Then, during a filtering stage, the search head may perform field-extraction operations on the superset to produce a reduced set of search results.

1.5 Field Extraction

Figure 14:
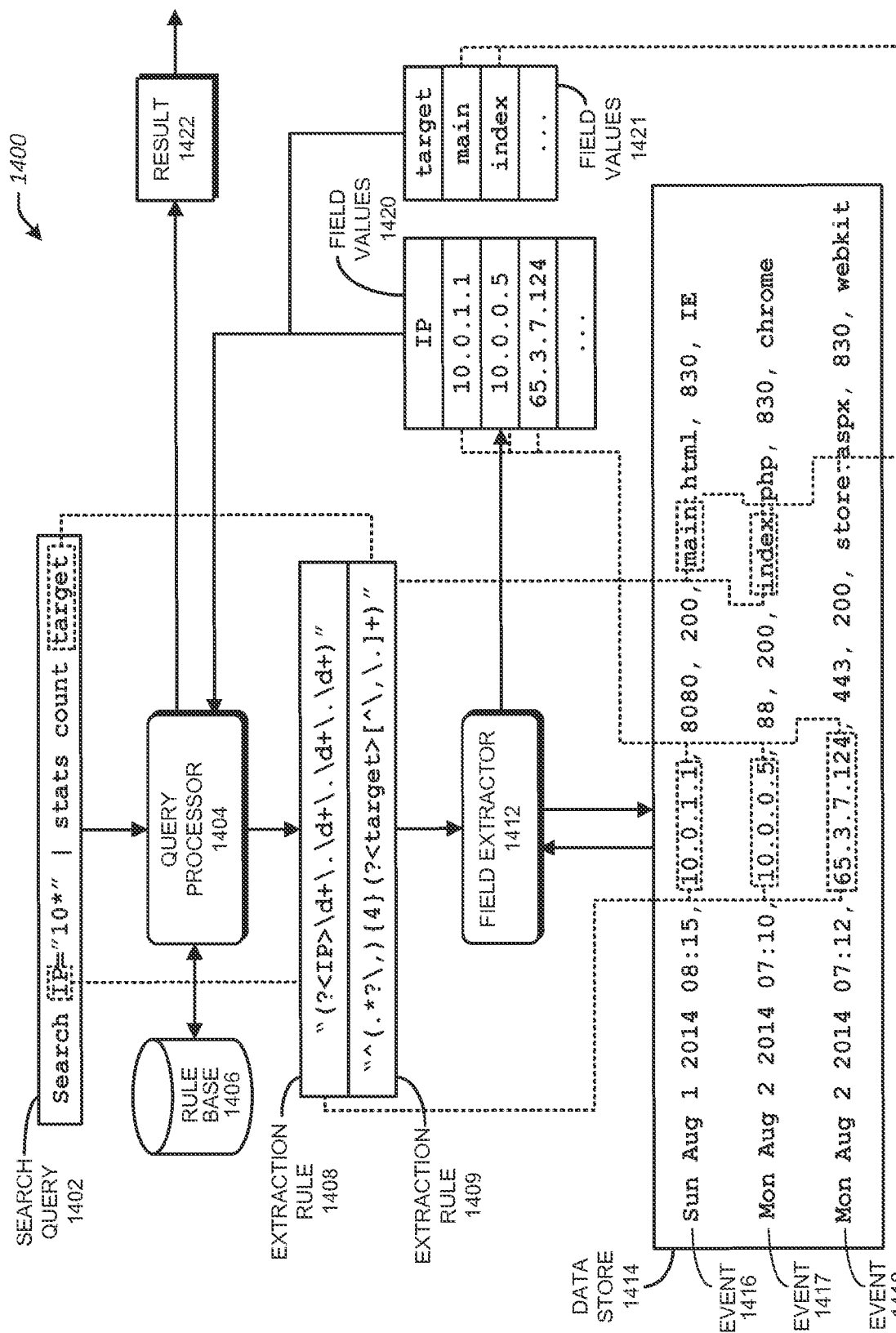
FIG. 14 presents a block diagram of an example system for processing search requests that use extraction rules for field values in accordance with one or more embodiments of the disclosure.

FIG. 14 presents a block diagram 1400 illustrating how fields may be extracted during query processing in accordance with the disclosed embodiments. At the start of this process, a search query 1402 is received at a query processor 1404. Query processor 1404 includes various mechanisms for processing a query, wherein these mechanisms may reside in a search head 1104 and/or an indexer 1102. Note that the exemplary search query 1402 illustrated in FIG. 14 is expressed in Search Processing Language (SPL), which is used in conjunction with the SPLUNK.RTM. ENTERPRISE system. SPL is a pipelined search language in which a set of inputs is operated on by a first command in a command line, and then a subsequent command following the pipe symbol "|" operates on the results produced by the first command, and so on for additional commands. Search query 1402 may also be expressed in other query languages, such as the Structured Query Language ("SQL") or any suitable query language.

Upon receiving search query 1402, query processor 1404 sees that search query 1402 includes two fields "IP" and "target." Query processor 1404 also determines that the values for the "IP" and "target" fields have not already been extracted from events in data store 414, and consequently determines that query processor 1404 needs to use extraction rules to extract values for the fields. Hence, query processor 1404 performs a lookup for the extraction rules in a rule base 1406, wherein rule base 1406 maps field names to corresponding extraction rules and obtains extraction rules 1408-409, wherein extraction rule 1408 specifies how to extract a value for the "IP" field from an event, and extraction rule 1409 specifies how to extract a value for the "target" field from an event. As is illustrated in FIG. 14, extraction rules 1408-409 may comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself may specify one or more extraction rules.

Next, query processor 1404 sends extraction rules 1408-409 to a field extractor 1412, which applies extraction rules 1408-409 to events 1416-1418 in a data store 1414. Note that data store 1414 may include one or more data stores, and extraction rules 1408-1409 may be applied to large numbers of events in data store 1414, and are not meant to be limited to the three events 1416-1418 illustrated in FIG. 14. Moreover, the query processor 1404 may instruct field extractor 1412 to apply the extraction rules to all the events in a data store 414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that query results may be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 16A:
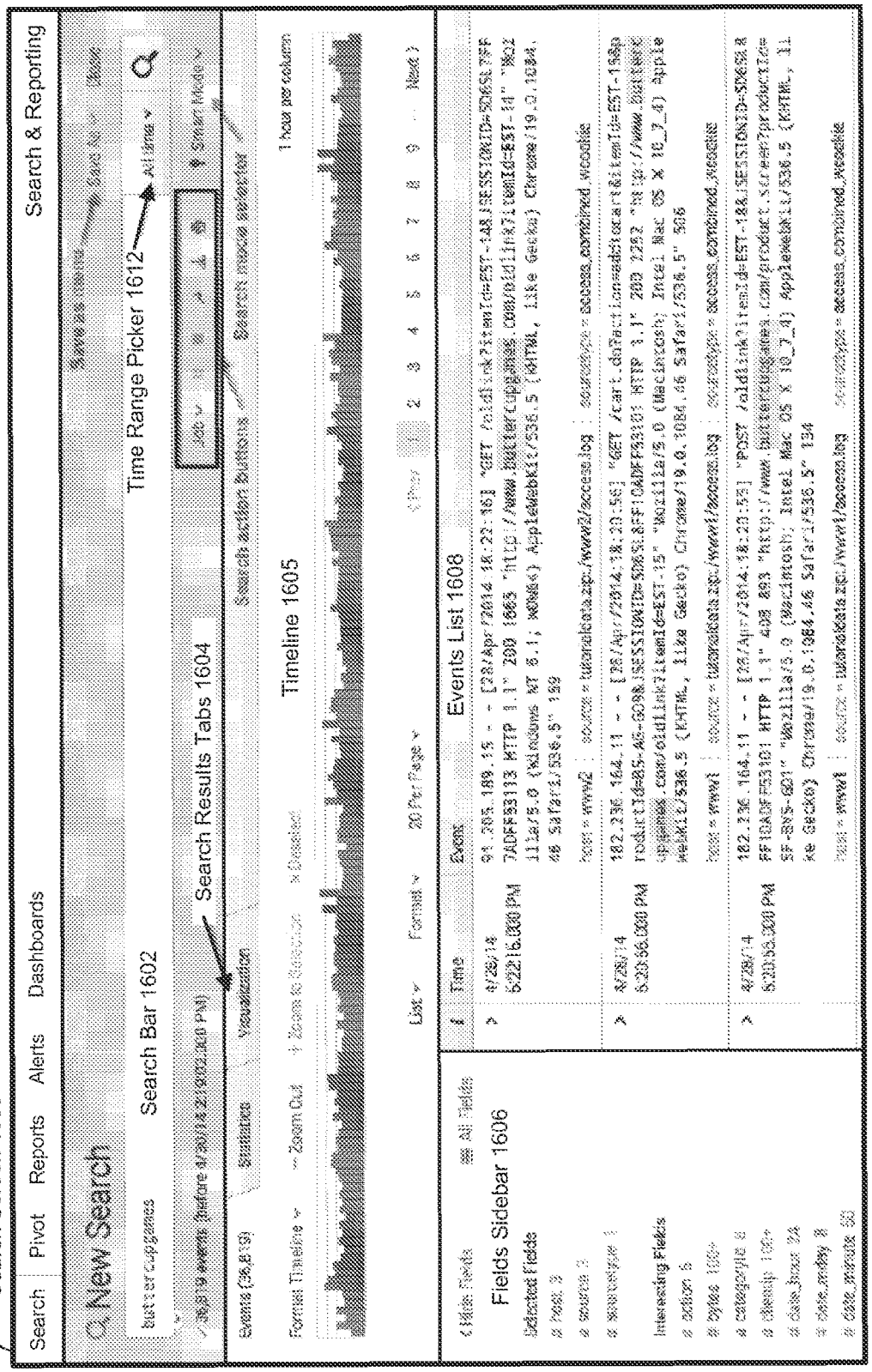
FIG. 16A illustrates an example search screen in accordance with one or more embodiments of the disclosure.
Figure 16B:
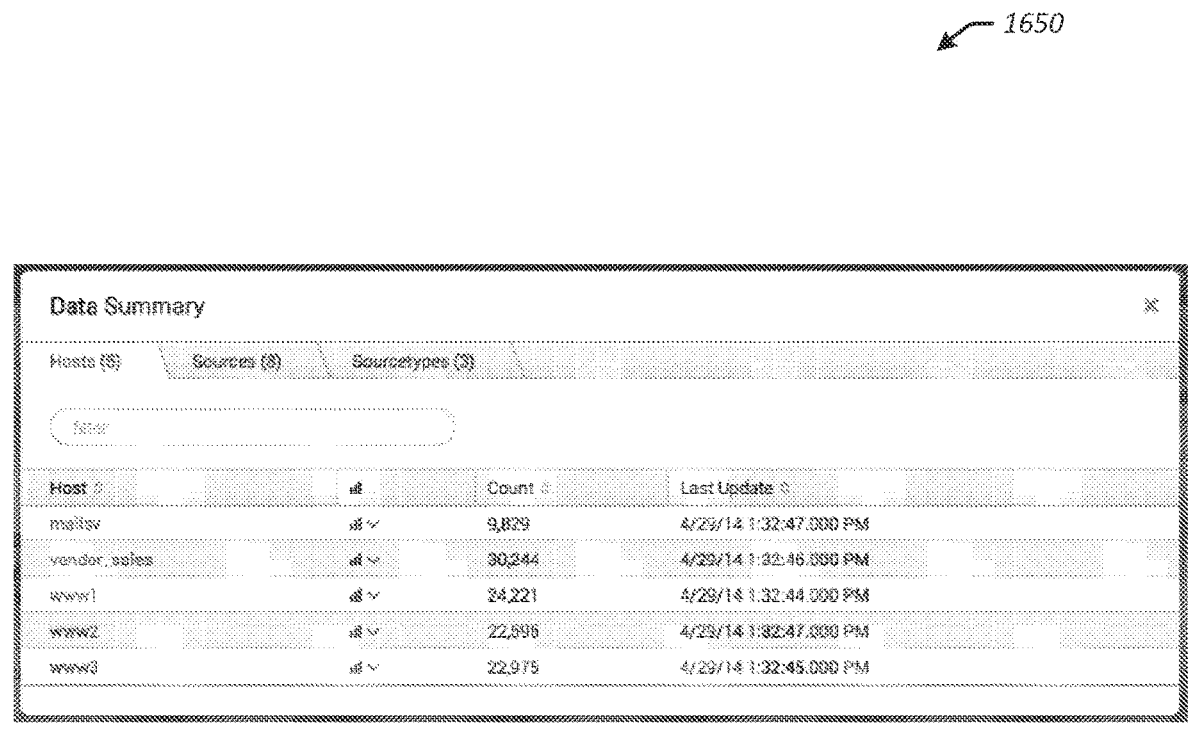

FIG. 16A illustrates an exemplary search screen 1600 in accordance with the disclosed embodiments. Search screen 1600 includes a search bar 1602 that accepts user input in the form of a search string. It also includes a time range picker 612 that enables the user to specify a time range for the search. For "historical searches" the user may select a specific time range, or alternatively a relative time range, such as "today," "yesterday" or "last week." For "real-time searches," the user may select the size of a preceding time window to search for real-time events. Search screen 1600 also initially displays a "data summary" dialog 1650 as is illustrated in FIG. 16B that enables the user to select different sources for the event data, for example by selecting specific hosts and log files.

After the search is executed, the search screen 1600 may display the results through search results tabs 1604, wherein search results tabs 1604 includes: an "events tab" that displays various information about events returned by the search; a "statistics tab" that displays statistics about the search results; and a "visualization tab" that displays various visualizations of the search results. The events tab illustrated in FIG. 16A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time may involve a large amount of data and require a large number of computational operations, which may cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query may be structured as a map-reduce computation, wherein the "map" operations are delegated to the indexers, while the corresponding "reduce" operations are performed locally at the search head. For example, FIG. 15 illustrates, via example queries 1500, how a search query 1501 received from a client at search head 1104 may split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 13, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flow charts in FIGS. 12 and 13, event-processing system 1100 may construct and maintain one or more keyword indices to facilitate rapidly identifying events containing specific keywords. This may greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer may access the keyword index to quickly identify events containing the keyword.

To speed up certain types of queries, some embodiments of system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table may keep track of occurrences of the value "94107" in a "ZIP code" field of a set of events, wherein the entry includes references to all of the events that contain the value "94107" in the ZIP code field. This enables the system to quickly process queries that seek to determine how many events have a particular value fora particular field, because the system may examine the entry in the summarization table to count instances of the specific value in the field without having to go through the individual events or do extractions at search time. Also, if the system needs to process all events that have a specific field-value combination, the system may use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system may maintain a separate summarization table for each indexer, wherein the indexer-specific summarization table only includes entries for the events in a data store that is managed by the specific indexer.

The summarization table may be populated by running a "collection query" that scans a set of events to find instances of a specific field-value combination, or alternatively instances of all field-value combinations for a specific field. A collection query may be initiated by a user, or may be scheduled to occur automatically at specific time intervals. A collection query may also be automatically launched in response to a query that asks for a specific field-value combination.

In some cases, the summarization tables may not cover all of the events that are relevant to a query. In this case, the system may use the summarization tables to obtain partial results for the events that are covered by summarization tables, but may also have to search through other events that are not covered by the summarization tables to produce additional results. These additional results may then be combined with the partial results to produce a final set of results for the query. This summarization table and associated techniques are described in more detail in U.S. Pat. No.

8,682,925, issued on Mar. 25, 2014, which is hereby incorporated herein by reference in its entirety for all purposes.

1.7.4 Accelerating Report Generation

In some embodiments, a data server system such as the SPLUNK.RTM. ENTERPRISE system may accelerate the process of periodically generating updated reports based on query results. To accelerate this process, a summarization engine automatically examines the query to determine whether generation of updated reports may be accelerated by creating intermediate summaries. (This is possible if results from preceding time periods may be computed separately and combined to generate an updated report. In some cases, it is not possible to combine such incremental results, for example where a value in the report depends on relationships between events from different time periods.) If reports may be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query may be run on this additional event data. Then, the results returned by this query on the additional event data, along with the partial results obtained from the intermediate summaries, may be combined to generate the updated report. This process is repeated each time the report is updated. Alternatively, if the system stores events in buckets covering specific time ranges, then the summaries may be generated on a bucket-by-bucket basis. Note that producing intermediate summaries may save the work involved in re-running the query for previous time periods, so only the newer event data needs to be processed while generating an updated report. These report acceleration techniques are described in more detail in U.S. Pat. No. 8,589,403, issued on Nov. 19, 2013, which is hereby incorporated herein by reference in its entirety for all purposes, and U.S. Pat. No. 8,412,696, issued on Apr. 2, 2011, which is hereby incorporated herein by reference in its entirety for all purposes.

1.8 Security Features

The SPLUNK.RTM. ENTERPRISE platform provides various schemas, dashboards and visualizations that make it easy for developers to create applications to provide additional capabilities. One such application is the SPLUNK.RTM. APP FOR ENTERPRISE SECURITY, which performs monitoring and alerting operations and includes analytics to facilitate identifying both known and unknown security threats based on large volumes of data stored by the SPLUNK.RTM. ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK.RTM. APP FOR ENTERPRISE SECURITY system stores large volumes of minimally processed security-related data at ingestion time for later retrieval and analysis at search time when a live security threat is being investigated. To facilitate this data retrieval process, the SPLUNK.RTM. APP FOR ENTERPRISE SECURITY provides pre-specified schemas for extracting relevant values from the different types of security-related event data, and also enables a user to define such schemas.

The SPLUNK.RTM. APP FOR ENTERPRISE SECURITY may process many types of security-related information. In general, this security-related information may include any information that may be used to identify security threats. For example, the security-related information may include network-related information, such as IP addresses, domain names, asset identifiers, network traffic volume, uniform resource locator strings, and source addresses. (The process of detecting security threats for network-related information is further described in U.S. patent application Ser. No. 13/956,252, and Ser. No. 13/956,262, which are both hereby incorporated herein by reference in its entirety for all purposes). Security-related information may also include endpoint information, such as malware infection data and system configuration information, as well as access control information, such as login/logout information and access failure notifications. The security-related information may originate from various sources within a data center, such as hosts, virtual machines, storage devices and sensors. The security-related information may also originate from various sources in a network, such as routers, switches, email servers, proxy servers, gateways, firewalls and intrusion-detection systems.

During operation, the SPLUNK.RTM. APP FOR ENTERPRISE SECURITY facilitates detecting so-called "notable events" that are likely to indicate a security threat. These notable events may be detected in a number of ways: (1) an analyst may notice a correlation in the data and may manually identify a corresponding group of one or more events as "notable;" or (2) an analyst may define a "correlation search" specifying criteria for a notable event, and every time one or more events satisfy the criteria, the application may indicate that the one or more events are notable. An analyst may alternatively select a pre-defined correlation search provided by the application. Note that correlation searches may be run continuously or at regular intervals (e.g., every hour) to search for notable events. Upon detection, notable events may be stored in a dedicated "notable events index," which may be subsequently accessed to generate various visualizations containing security-related information. Also, alerts may be generated to notify system operators when important notable events are discovered.

Figure 17A:
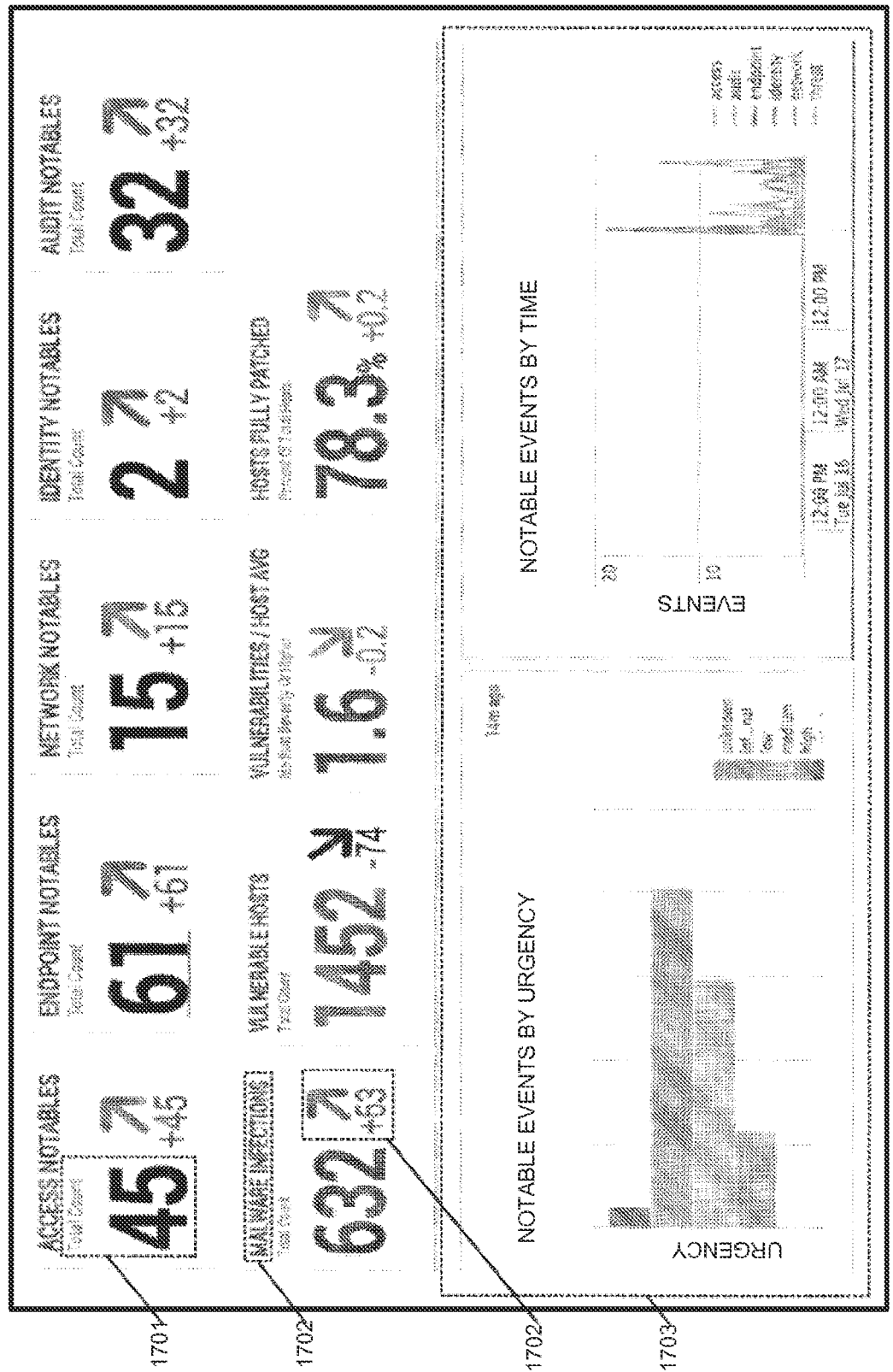
FIG. 17A illustrates an example key indicators view in accordance with one or more embodiments of the disclosure.

The SPLUNK.RTM. APP FOR ENTERPRISE SECURITY provides various visualizations to aid in discovering security threats, such as a "key indicators view" that enables a user to view security metrics of interest, such as counts of different types of notable events. For example, FIG. 17A illustrates an exemplary key indicators view 1700 that comprises a dashboard, which may display a value 1701, for various security-related metrics, such as malware infections

1702. It may also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated herein by reference in its entirety for all purposes.

1.9 Data Center Monitoring

Figure 17B:
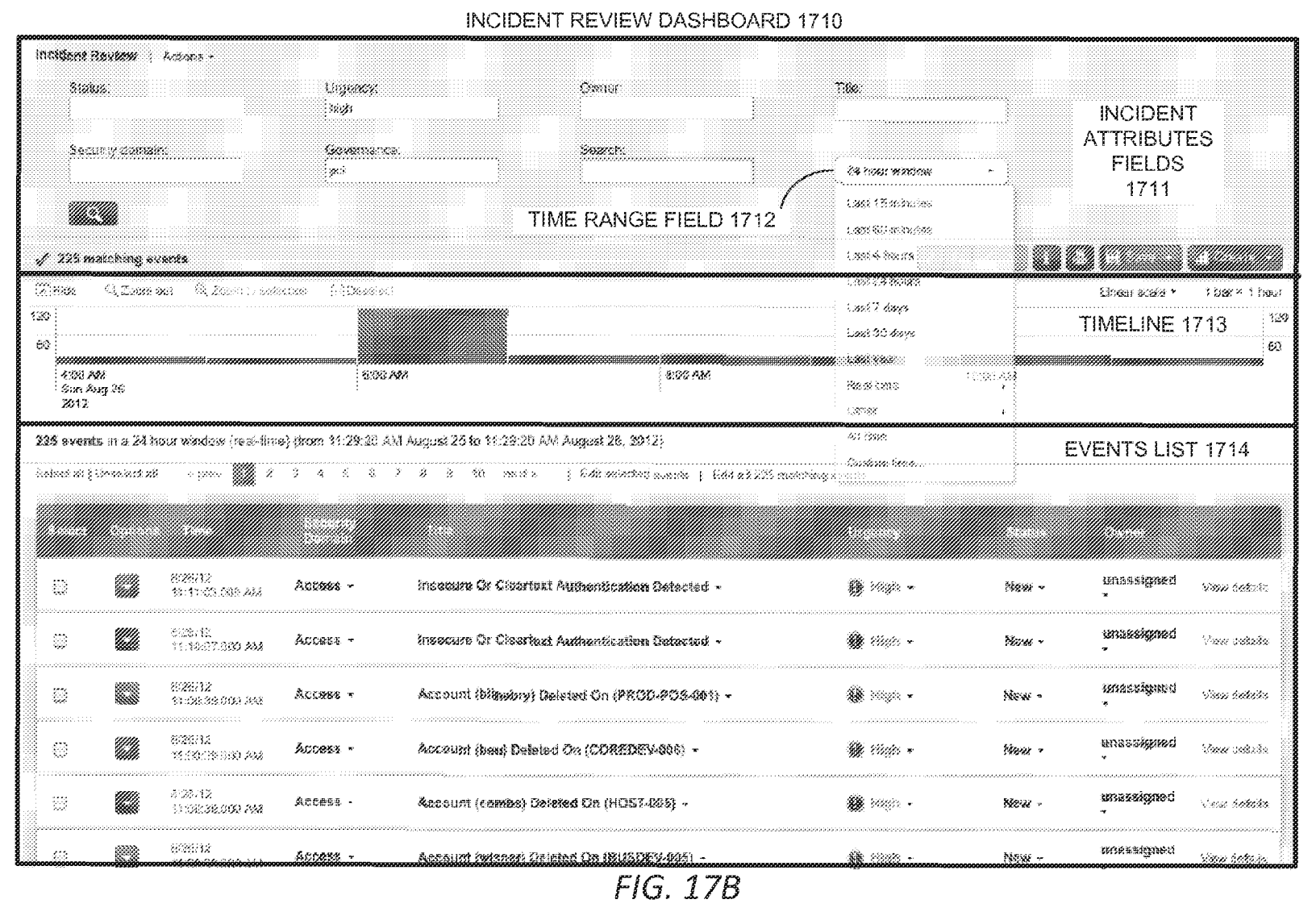

These visualizations may also include an "incident review dashboard" that enables a user to view and act on "notable events." These notable events may include: (1) a single event of high importance, such as any activity from a known web attacker; or (2) multiple events that collectively warrant review, such as a large number of authentication failures on a host followed by a successful authentication. For example, FIG. 17B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event may be associated with an urgency value (e.g., low, medium, high, critical), which is indicated in the incident review dashboard. The urgency value for a detected event may be determined based on the severity of the event and the priority of the system component associated with the event. The incident review dashboard is described further in "http://docs.splunk.com/Documentation/PCl/2.1.1/User/IncidentReviewdashbo-ard."

As mentioned above, the SPLUNK.RTM. ENTERPRISE platform provides various features that make it easy for developers to create various applications. One such application is the SPLUNK.RTM. APP FOR VMWARE.RTM., which performs monitoring operations and includes analytics to facilitate diagnosing the root cause of performance problems in a data center based on large volumes of data stored by the SPLUNK.RTM. ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK.RTM. APP FOR VMWARE.RTM. stores large volumes of minimally processed performance information and log data at ingestion time for later retrieval and analysis at search time when a live performance issue is being investigated.

The SPLUNK.RTM. APP FOR VMWARE.RTM. may process many types of performance-related information. In general, this performance-related information may include any type of performance-related data and log data produced by virtual machines and host computer systems in a data center. In addition to data obtained from various log files, this performance-related information may include values for performance metrics obtained through an application programming interface (API) provided as part of the vSphere Hypervisor.TM. system distributed by VMware, Inc. of Palo Alto, Calif. For example, these performance metrics may include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference in its entirety for all purposes. Also, see "vSphere Monitoring and Performance," Update 1, vSphere 5.5, EN-001357-00, http://pubs.vmware.com/vsphere-55/topic/com.vmware.lCbase/PDF/vsphere-esx-i-vcenter-server-551-monitoring-performance-guide .pdf.

To facilitate retrieving information of interest from performance data and log files, the SPLUNK.RTM. APP FOR VMWARE.RTM. provides pre-specified schemas for extracting relevant values from different types of performance-related event data, and also enables a user to define such schemas.

Figure 17C:
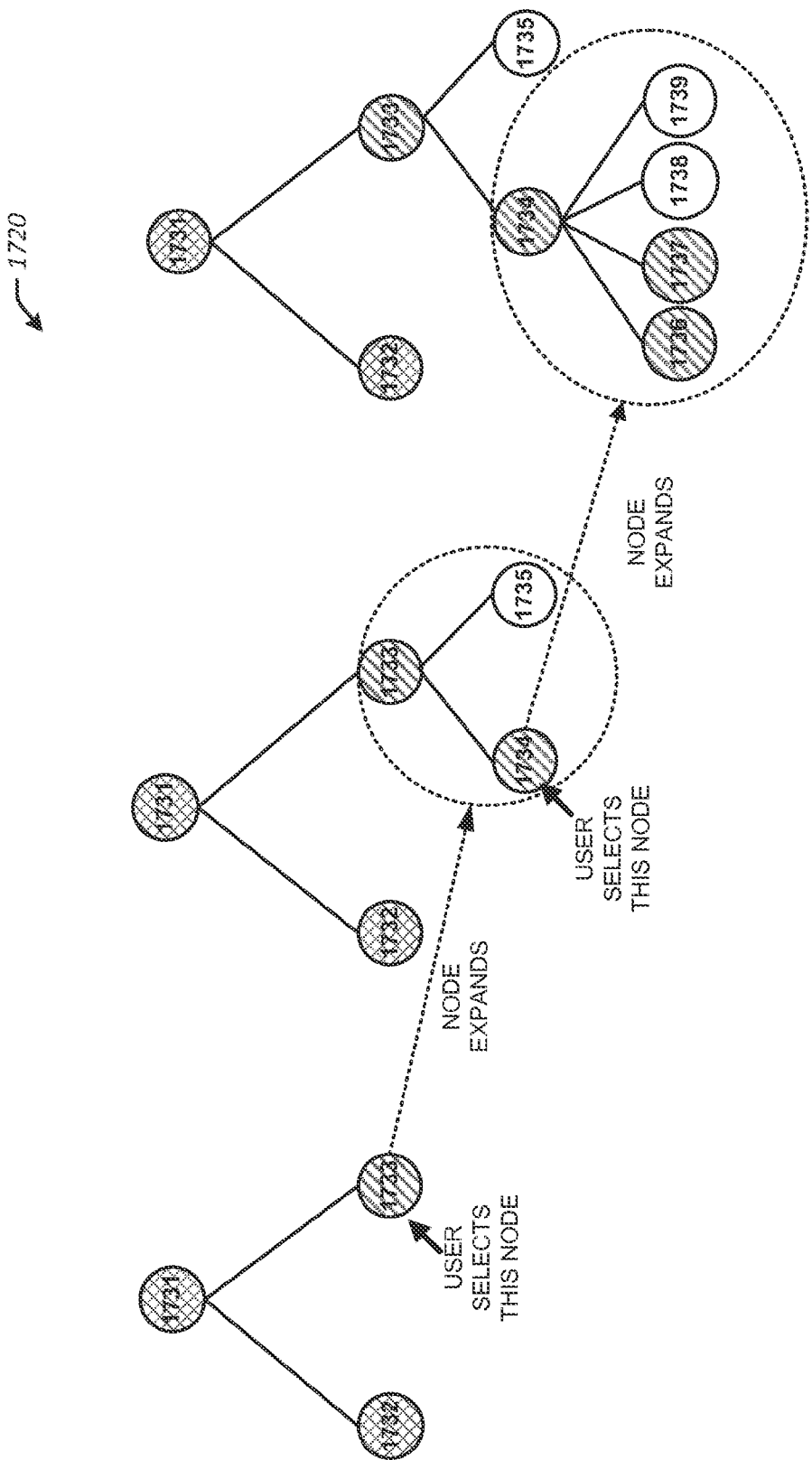
FIG. 17C illustrates an example proactive monitoring tree in accordance with one or more embodiments of the disclosure.
Figure 17D:
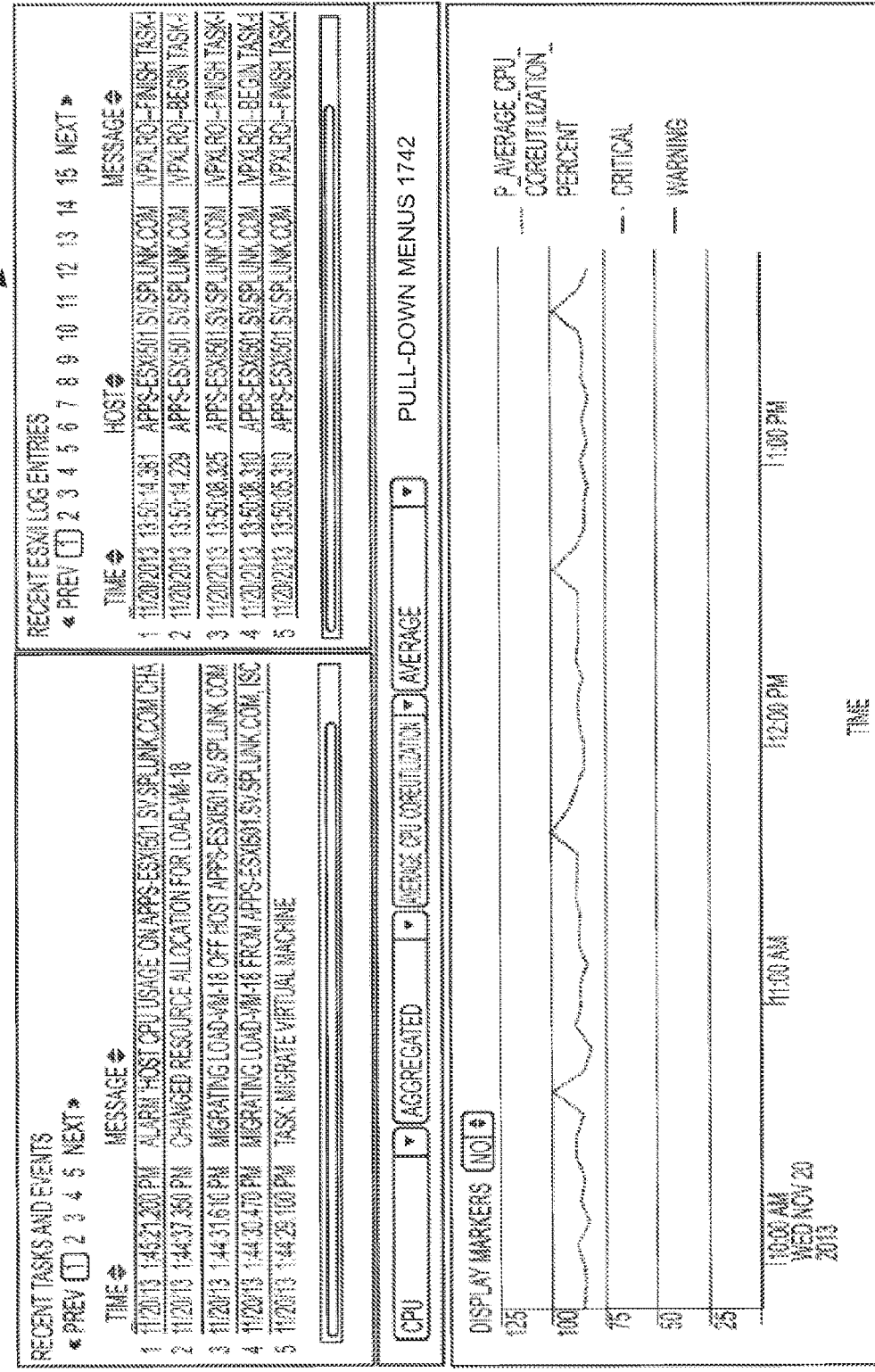
FIG. 17D illustrates an example screen displaying both log data and performance data in accordance with one or more embodiments of the disclosure.

The SPLUNK.RTM. APP FOR VMWARE.RTM. additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations 1720 are illustrated in FIG. 17C, wherein nodes 1733 and 1734 are selectively expanded. Note that nodes 1731-1739 may be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference in its entirety for all purposes.

The SPLUNK.RTM. APP FOR VMWARE.RTM. also provides a user interface that enables a user to select a specific time range and then view heterogeneous data, comprising events, log data and associated performance metrics, for the selected time range. For example, the screen 1750 illustrated in FIG. 17D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference in its entirety for all purposes.

Figure 18:
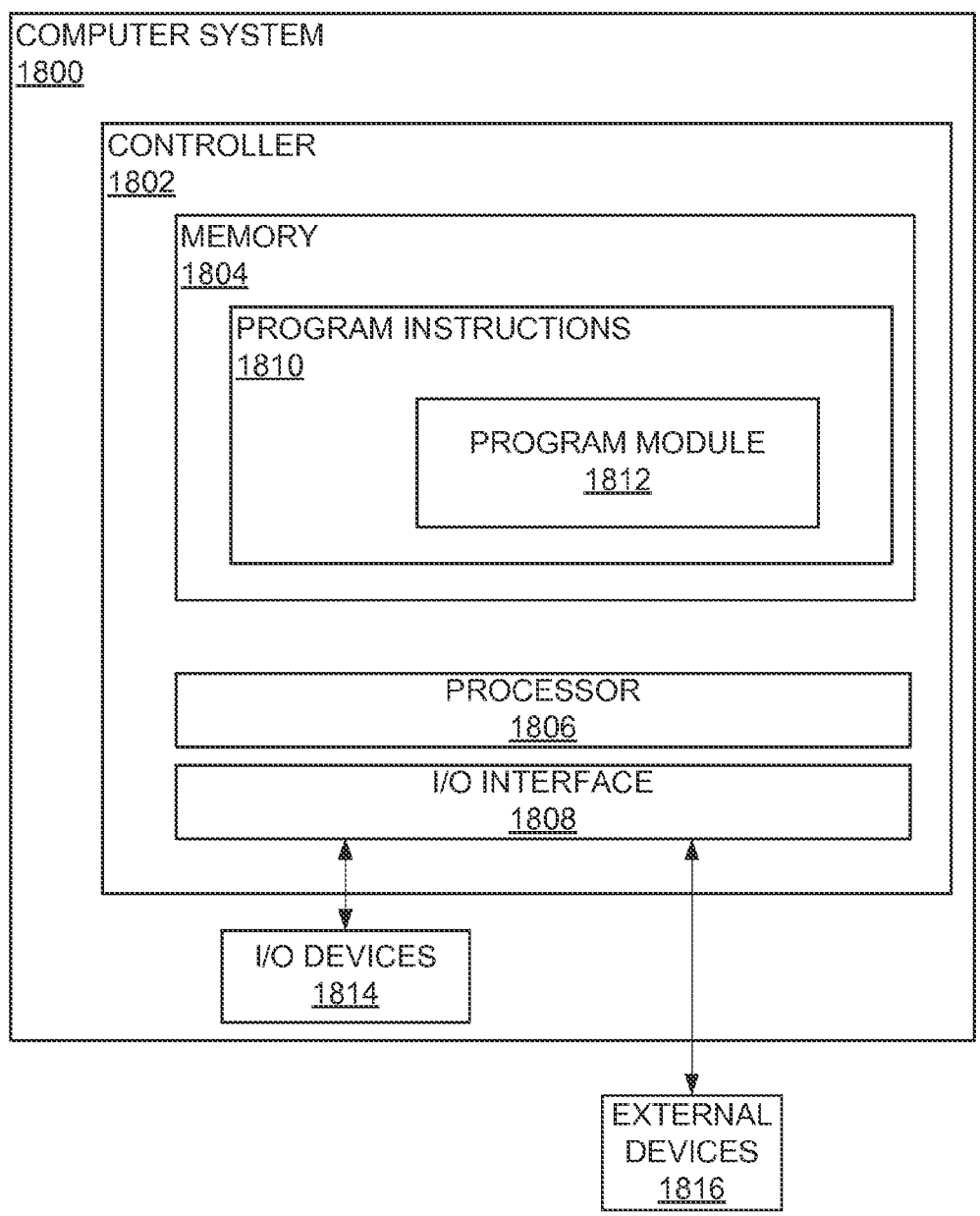
FIG. 18 is a diagram that illustrates an example computer system in accordance with one or more embodiments of the disclosure.

FIG. 18 is a diagram that illustrates an example computer system 1800 in accordance with the disclosed embodiments. In some embodiments, the computer system 1800 includes a controller 1802 for controlling the operational aspects of the computer system 1800. In some embodiments, the controller 1802 includes a memory 1804, a processor 1806, and an input/output (I/O) interface 1808. The memory 1804 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 1804 may include a non-transitory computer-readable storage medium having program instructions 1810 stored thereon that are executable by a computer processor (e.g., the processor 1806) to cause the functional operations (e.g., methods, routines, or processes) described herein. The program instructions 1810 may include program modules 1812 (e.g., including program instructions) that are executable by the processor 1806 to provide some or all of the functionality described herein, including that described with regard to the server 502, the data sources 504, the client devices 506, and/or the methods 600, 700, 800, 900 and/or 1000. The program instructions 1810 may include, for example, program modules 1812 such as one or more of the modules of service analyzer 522 (e.g., one or more of the definition module 550, the machine monitoring module 552, the component service monitoring module 554, the threshold event monitoring module 556, and the graphical user (GUI) interface module 558).

The processor 1806 may be any suitable processor capable of executing/performing program instructions. The processor 1806 may include a central processing unit (CPU) that carries out program instructions (e.g., program instructions of the program module(s) 1812) to perform arithmetical, logical, and input/output operations described herein, including those described with regard to server 502, the data sources 504, the client devices 506 and/or other entities described. The processor 1806 may include one or more processors.

The I/O interface 1808 may provide an interface for communication with one or more I/O devices 1814, such as a mouse/keyboard/touchscreen, a graphical user interface (GUI) (e.g., a display), and/or the like. A display may include a suitable electronic display that may display dashboards 100, 300 and 400 and/or the like. Devices may be connected to the I/O interface 1808 via a wired or wireless connection. The I/O interface 1808 may provide an interface for communication with one or more external devices 1816, such as various components and entities of the environment 500, including the network 508.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method, comprising:
    generating a graphical user interface (GUI), wherein the GUI includes a map component;
    generating, on the map component, a path including a first set of locations, wherein the first set of locations is associated with a set of field values that correspond to a time range, and wherein the GUI includes a timeline that indicates the time range;
    receiving an input, via the timeline, that identifies a time window within the time range, wherein the timeline includes an indicator that identifies the time window within the time range; and
    generating an updated path on the map component, wherein the updated path is associated with a subset of the set of field values, and the subset of the set of field values corresponds to the time window within the time range.

2. The method of claim 1, wherein the set of field values is extracted from time-stamped, searchable events comprising raw machine data.

3. The method of claim 1, wherein the updated path includes a second set of locations, and the second set of locations is associated with the subset of the set of field values.

4. The method of claim 3, wherein the second set of locations is a subset of the first set of locations.

5. The method of claim 1, wherein a first location of the first set of locations is associated with a first field value of the set of field values, and the map component includes an indicator that associates the first location with the first field value.

6. The method of claim 1, wherein the map component automatically progresses the time window along the time range at a given rate, and the method includes updating the map component to indicate, for each first time window within the time range, a subset of the first set of locations that is associated with the first time window.

7. The method of claim 1, wherein the input indicates a location within the map component, and the method further comprises determining the time window within the time range that is associated with the location indicated by the input.

8. The method of claim 1, wherein the method further comprises generating, within the GUI, a tile component that indicates one or more metrics based on the subset of the set of field values.

9. The method of claim 1, wherein each field value of the set of field values is associated with a time period of a first time period size within the time range, each field value of the subset of the field values is associated with a time period of a second time period size within the time window, and the second time period size is smaller than the first time period size.

10. One or more non-transitory computer-readable media including instructions that, when executed by at least one processor, cause the at least one processor to perform the steps of:
    generating a graphical user interface (GUI), wherein the GUI includes a map component;
    generating, on the map component, a path comprising a first set of locations, wherein the first set of locations is associated with a set of field values that correspond to a time range, and wherein the GUI includes a timeline that indicates the time range;
    receiving an input, via the timeline, that identifies a time window within the time range, wherein the timeline includes an indicator that identifies the time window within the time range; and
    generating an updated path on the map component, wherein the updated path is associated with a subset of the set of field values, and the subset of the set of field values corresponds to the time window within the time range.

11. The one or more non-transitory computer-readable media of claim 10, wherein the set of field values is extracted from time-stamped, searchable events comprising raw machine data.

12. The one or more non-transitory computer-readable media of claim 10, wherein the updated path includes a second set of locations, and the second set of locations is associated with the subset of the set of field values.

13. The one or more non-transitory computer-readable media of claim 12, wherein the second set of locations is a subset of the first set of locations.

14. The one or more non-transitory computer-readable media of claim 10, wherein a first location of the first set of locations is associated with a first field value of the set of field values, and the map component includes an indicator that associates the first location with the first field value.

15. The one or more non-transitory computer-readable media of claim 10, wherein the map component automatically progresses the time window along the time range at a given rate, and the at least one processor, when executing the instructions, further performs the step of updating the map component to indicate, for each first time window within the time range, a subset of the first set of locations that is associated with the first time window.

16. The one or more non-transitory computer-readable media of claim 10, wherein the input indicates a location within the map component, and the at least one processor, when executing the instructions, further performs the step of determining the time window within the time range that is associated with the location indicated by the input.

17. The one or more non-transitory computer-readable media of claim 10, wherein the at least one processor, when executing the instructions, further performs the step of generating, within the GUI, a tile component that indicates one or more metrics based on the subset of the set of field values.

18. A system comprising:
    at least one memory storing computer-executable instructions; and
    at least one processor that, when executing the computer-executable instructions, is configured to perform the steps of:
        generating a graphical user interface (GUI), wherein the GUI includes a map component;
        generating, on the map component, a path comprising a first set of locations, wherein the first set of locations is associated with a set of field values that correspond to a time range, and wherein the GUI includes a timeline that indicates the time range;
        receiving an input, via the timeline, that identifies a time window within the time range, wherein the timeline includes an indicator that identifies the time window within the time range; and
        generating an updated path on the map component, wherein the updated path is associated with a subset of the set of field values, and the subset of the set of field values corresponds to the time window within the time range.

* * * * *